US011775476B2

(12) United States Patent
George et al.

(10) Patent No.: US 11,775,476 B2
(45) Date of Patent: *Oct. 3, 2023

(54) TECHNIQUES FOR SNAPSHOTTING SCALABLE MULTITIER STORAGE STRUCTURES

(71) Applicant: Microsoft Technology Licensing, LLC, Redmond, WA (US)

(72) Inventors: Mathew George, Redmond, WA (US); David Matthew Kruse, Kirkland, WA (US); Vladimir Petter, Bellevue, WA (US); Roopesh C Battepati, Bellevue, WA (US); Henry Gabryjelski, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,970

(22) Filed: Dec. 20, 2021

(65) Prior Publication Data

US 2022/0114141 A1 Apr. 14, 2022

Related U.S. Application Data

(63) Continuation of application No. 16/360,804, filed on Mar. 21, 2019, now Pat. No. 11,204,892.

(51) Int. Cl.
*G06F 16/18* (2019.01)
*G06F 16/11* (2019.01)
(Continued)

(52) U.S. Cl.
CPC ........ *G06F 16/128* (2019.01); *G06F 11/1451* (2013.01); *G06F 16/148* (2019.01); *G06F 16/182* (2019.01); *G06F 2201/84* (2013.01)

(58) Field of Classification Search
CPC .. G06F 11/1451; G06F 16/128; G06F 16/148; G06F 16/182; G06F 2201/84; G06F 11/14; G06F 11/16
See application file for complete search history.

(56) References Cited

U.S. PATENT DOCUMENTS 8,438,196 B1 5/2013 Cook
8,818,951 B1 * 8/2014 Muntz ................. G06F 16/1827
707/639

(Continued)

FOREIGN PATENT DOCUMENTS

| CN | 101535968 A | 9/2009 |
|---|---|---|
| WO | 2015145632 A1 | 10/2015 |
| WO | 2016204790 A1 | 12/2016 |

OTHER PUBLICATIONS

"Notice of Allowance Issued in U.S. Appl. No. 15/989,680", dated Dec. 2, 2021, 15 Pages.

(Continued)

*Primary Examiner* — Merilyn P Nguyen
(74) *Attorney, Agent, or Firm* — Newport IP, LLC; Jacob P. Rohwer

(57) ABSTRACT

Examples described herein generally relate to maintaining a snapshot of a multitier distributed file system. A snapshot directory volume of a directory volume can be created at least in part by copying, to the snapshot directory volume, metadata of the directory volume. Based on a file access request, it can be determined whether the file has not been snapshotted. If not, a snapshot file record of the file, and associated with the snapshot directory volume.

20 Claims, 19 Drawing Sheets

(51) Int. Cl.
  *G06F 16/182* (2019.01)
  *G06F 16/14* (2019.01)
  *G06F 11/14* (2006.01)

(56) References Cited

U.S. PATENT DOCUMENTS

| | | | |
|---|---|---|---|
| 8,984,221 B2* | 3/2015 | Satoyama | G06F 3/0605 |
| | | | 711/117 |
| 9,383,924 B1 | 7/2016 | Fullbright et al. | |
| 10,084,873 B2* | 9/2018 | Dornemann | H04L 41/042 |
| 10,353,790 B1* | 7/2019 | Rangaiah | G06F 11/1451 |
| 10,387,381 B1 | 8/2019 | Patwardhan et al. | |
| 10,678,452 B2 | 6/2020 | Karr et al. | |
| 11,301,421 B2 | 4/2022 | Petters et al. | |
| 2007/0179995 A1* | 8/2007 | Prahlad | G06F 16/1727 |
| 2009/0106255 A1* | 4/2009 | Lacapra | G06F 11/1076 |
| 2010/0070726 A1* | 3/2010 | Ngo | G06F 11/1469 |
| | | | 711/E12.001 |
| 2010/0274784 A1 | 10/2010 | Acharya | |
| 2011/0161299 A1* | 6/2011 | Prahlad | G06F 16/128 |
| | | | 707/649 |
| 2012/0072596 A1 | 3/2012 | Kruse et al. | |
| 2012/0084523 A1* | 4/2012 | Littlefield | G06F 3/0641 |
| | | | 711/E12.103 |
| 2013/0268493 A1* | 10/2013 | Berman | G06F 11/1469 |
| | | | 707/649 |
| 2013/0282662 A1* | 10/2013 | Kumarasamy | G06F 3/0689 |
| | | | 707/649 |
| 2016/0371153 A1* | 12/2016 | Dornemann | G06F 11/1458 |
| 2017/0208125 A1 | 7/2017 | Jai et al. | |
| 2019/0220528 A1* | 7/2019 | Cruciani | G06F 16/174 |
| 2020/0026438 A1* | 1/2020 | Peleg | G06F 3/0613 |
| 2020/0125460 A1 | 4/2020 | Selvaraj et al. | |
| 2022/0261377 A1 | 8/2022 | Petters et al. | |
| 2022/0350893 A1 | 11/2022 | George et al. | |

OTHER PUBLICATIONS

"Non Final Office Action Issued in U.S. Appl. No. 16/427,707", dated Feb. 8, 2022, 10 Pages.

"Notice of Allowance Issued in U.S. Appl. No. 16/427,707", dated May 4, 2022, 10 Pages.

U.S. Appl. No. 16/427,707, filed May 31, 2019.

"Office Action Issued in European Patent Application No. 19728561. 2", dated Jul. 25, 2022, 8 Pages.

Seipel, et al., "Providing File Services using a Distributed Hash Table", In Proceedings of the 11th International Conference on Interactive Systems, Sep. 10, 2015, 6 Pages.

"Non Final Office Action Issued in U.S. Appl. No. 17/689,824", dated Sep. 9, 2022, 8 Pages.

"Office Action Issued in European Patent Application No. 20730156. 5", dated Mar. 1, 2023, 9 Pages.

"First Office Action Issued in U.S. Appl. No. 17/689,824", dated Apr. 20, 2023, 11 Pages.

"Notice of Allowance Issued in U.S. Appl. No. 17/813,057", dated Jul. 26, 2023, 10 Pages.

U.S. Appl. No. 16/360,804, filed Mar. 21, 2019.

* cited by examiner

TECHNIQUES FOR SNAPSHOTTING SCALABLE MULTITIER STORAGE STRUCTURES

CROSS-REFERENCE TO RELATED APPLICATION

This application is a continuation of, and claims priority to, U.S. patent application Ser. No. 16/360,804, issued as U.S. Pat. No. 11,204,892, filed on Mar. 21, 2019, and entitled "TECHNIQUES FOR SNAPSHOTTING SCALABLE MULTITIER STORAGE STRUCTURES", the specification of which is hereby incorporated by reference in its entirety for all that it teaches and suggests.

BACKGROUND

The present disclosure relates to computing systems, and more particularly, to managing snapshots in a scalable multitier storage structure for one or more computer devices.

Network storage systems have developed in response to the increasing proliferation of data requirements. Network storage systems generally focus on the storage, protection and retrieval of data in large-scale environments. Many corporations and organizations have large sets of electronic content such as files to be stored and maintained. As time passes, these sets of content tend to grow, and ultimately reach a size which is often too great for a single repository. Nonetheless, the organization may desire to manage this content in a uniform way, even if the content is spread across several physical data stores. Managing such electronic content may present challenges as the size of a storage system containing the electronic content may be limited. As such, the storage system may need to be scaled to expand the storage capabilities. Conventional scaling techniques, however, may suffer from a number of disadvantages bound by hardware limitations (processor, memory, storage limitations, etc.).

In light of the above, scalable multitier storage structures are being developed to place actual storage content on various distributed data stores, and to include separable volume information that provides pointers and/or access to the distributed storage content. In a three-tier structure, a directory volume can be provided that includes information of various files in the directory volume, and each file can have a file volume that points to one or more shards in a shard volume that make up the file. The shards can be stored in substantially any data store, and the various volume information can formulate files from the shards, and directories of files.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure provides a method of deleting an entry from a storage system. The method may include receiving, at the storage system, a deletion request for the entry, the entry corresponding to either a file or a directory in the storage system. The method may further include determining directory metadata from a directory volume, the directory metadata associated with the entry. The method may additionally include determining whether the entry corresponds to the file or the directory based on the directory metadata. Moreover, the method may include requesting deletion of the directory metadata associated with the entry from the directory volume based on a determination that the entry corresponds to the directory. The method may also include requesting deletion of the directory metadata associated with the entry from the directory volume and requesting deletion of the file from the file volume based on a determination that the entry corresponds to the file.

The present disclosure provides a storage system including a memory configured to store data and at least one processor in communication with the memory. The at least one processor may be configured to receive a deletion request for the entry, the entry corresponding to either a file or a directory in the storage system. The at least one processor may further be configured to determine directory metadata from a directory volume, the directory metadata associated with the entry. The at least one processor may additionally be configured to determine whether the entry corresponds to the file or the directory based on the directory metadata. Moreover, the at least one processor may be configured to request deletion of the directory metadata associated with the entry from the directory volume based on a determination that the entry corresponds to the directory. The at least one processor may further be configured to request deletion of the directory metadata associated with the entry from the directory volume and request deletion of the file from the file volume based on a determination that the entry corresponds to the file.

The present disclosure provides a computer-readable medium storing instructions executable at a storage system. The computer-readable medium including at least one instruction for causing the storage system to receive a deletion request for the entry, the entry corresponding to either a file or a directory in the storage system. The computer-readable medium further including at least one instruction for causing the storage system to determine directory metadata from a directory volume, the directory metadata associated with the entry. The computer-readable medium additionally including at least one instruction for causing the storage system to determine whether the entry corresponds to the file or the directory based on the directory metadata. Moreover, the computer-readable medium including at least one instruction for causing the storage system to request deletion of the directory metadata associated with the entry from the directory volume based on a determination that the entry corresponds to the directory. The computer-readable medium including at least one instruction for causing the storage system to request deletion of the directory metadata associated with the entry from the directory volume and request deletion of the file from the file volume based on a determination that the entry corresponds to the file.

The present disclosure provides a method of adding an entry into a storage system. The method may include receiving, at the storage system, a request for adding the entry. The method may further include determining that directory metadata associated with the entry does not exist in a directory volume. The method may further include determining whether the entry corresponds to the file or the directory. The method may further include generating the directory metadata associated with the entry in the directory volume based on a determination that the entry corresponds to the directory. The method may further include determining to add the file to a file volume, allocating file metadata in the file volume, the file metadata associated with the file, and generating the directory metadata associated with the entry in the directory volume based on a determination that the entry corresponds to the file.

The present disclosure provides a storage system including a memory configured to store data and at least one processor in communication with the memory. The at least one processor may be configured to receive, at the storage system, a request for adding the entry. The at least one processor may further be configured to determine that directory metadata associated with the entry does not exist in a directory volume. The at least one processor may further be configured to determine whether the entry corresponds to the file or the directory. The at least one processor may further be configured to determine whether the entry corresponds to the file or the directory. The at least one processor may further be configured to generate the directory metadata associated with the entry in the directory volume based on a determination that the entry corresponds to the directory. The at least one processor may further be configured to determine to add the file to a file volume, allocate file metadata in the file volume, the file metadata associated with the file, generate the directory metadata associated with the entry in the directory volume based on a determination that the entry corresponds to the file.

The present disclosure provides a computer-readable medium storing instructions executable at a storage system. The computer-readable medium including at least one instruction for causing the storage system to receive, at the storage system, a request for adding the entry. The computer-readable medium including at least one instruction for causing the storage system to determine that directory metadata associated with the entry does not exist in a directory volume. The computer-readable medium including at least one instruction for causing the storage system to determine whether the entry corresponds to the file or the directory. The computer-readable medium including at least one instruction for causing the storage system to generate the directory metadata associated with the entry in the directory volume based on a determination that the entry corresponds to the directory. The computer-readable medium including at least one instruction for causing the storage system to determine to add the file to a file volume, allocate file metadata in the file volume, the file metadata associated with the file, and generate the directory metadata associated with the entry in the directory volume based on a determination that the entry corresponds to the file.

Additional advantages and novel features relating to implementations of the present disclosure will be set forth in part in the description that follows, and in part will become more apparent to those skilled in the art upon examination of the following or upon learning by practice thereof.

DESCRIPTION OF THE DRAWINGS

The present disclosure will be better understood from the following detailed description read in light of the accompanying drawings, wherein like reference numerals are used to designate like parts in the accompanying description.

DETAILED DESCRIPTION

Figure 1:
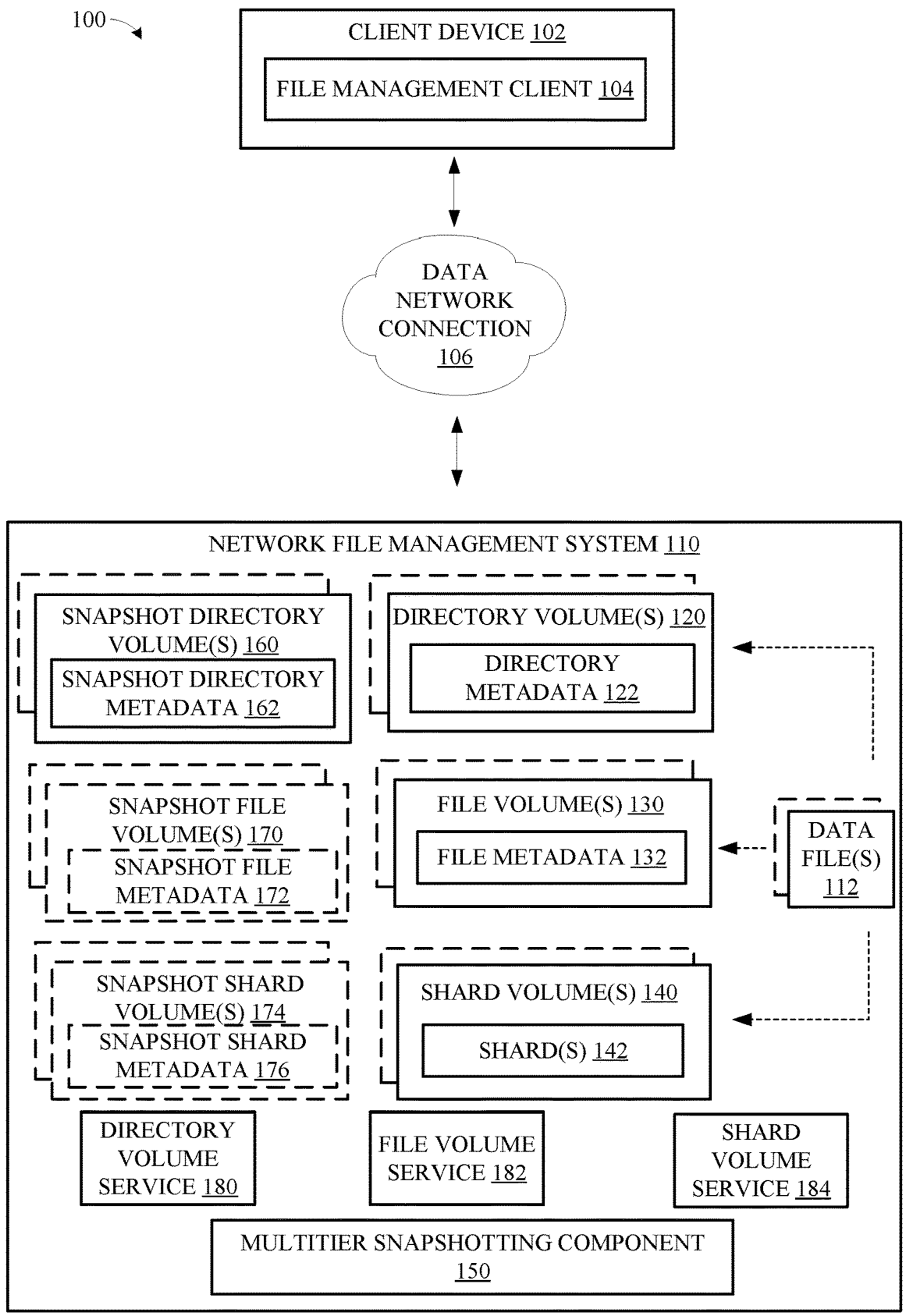
FIG. 1 is a block diagram of a client device in communication with a network file management system in accordance with one or more implementations of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to managing snapshots in multitier storage structures. For example, a multitier storage structure may have multiple tiers of volumes that manage storage, retrieval, modification, deletion, etc., of files over distributed physical data stores, as described. Accordingly, managing initiation of snapshots, recalling of a snapshot, deleting of a snapshot, etc., may present some challenges based on the distributed nature of the multitier storage structure. To minimize overhead associated with creating a snapshot of a multitier storage structure, for example, a copy-on-write mechanism can be used to modify a snapshot record when a file is written or otherwise modified. Such mechanisms allow for recall of a snapshot by taking a current structure, and applying changes that are journaled by the copy-on-write. Thus, for example, creating a snapshot of a multitier storage structure can include creating a snapshot record that points to the current multitier storage structure, and then journaling changes associated with the snapshot record as the current multitier storage structure is modified.

As such, for example, when a file access request is made for a file of the multitier storage structure (e.g., a request to open the file, other than a read-only version, a request to move the file, delete the file, etc.), a copy of the file can be made in a snapshot directory, where the directory can include snapshot versions of files modified since the snapshot, and metadata associated with the file can be updated in a snapshot directory volume. In another example, a file volume snapshot can be created for the file volume. In either case, the file access request can then be granted to allow modifying of the file on the current volume. For a given file, for example, a snapshot identifier can be associated with the file (in metadata for the file) to for which snapshot the file was snapshotted. This can avoid a subsequent snapshot of the modified file, and/or can trigger an initial copy-on-write for the file in a newer snapshot. In addition, similar functionality can be pushed to shards that comprise the file, as described further herein.

Furthermore, for example, recalling a snapshot (or more specifically a file from the snapshot) can include obtaining file(s) from the current directory volume that have not been modified since the snapshot was created, and/or pulling the accessed file(s) from the snapshot directory based on the metadata for the snapshot directory volume. Where additional snapshots have been created, recalling may also include pulling accessed file(s) from more recent snapshots so that recording of access requests need not be made in each snapshot. This, for example, can make file modification more efficient at the cost of adding logic for pulling files from snapshots. In addition, deleting a snapshot can include deleting the snapshot volumes that were created, associated files in the snapshot directory, etc., and in one example, a deletion request for a more recent snapshot may be held until all prior snapshots are deleted (e.g., as the prior snapshot may rely on more recent snapshots, as described above).

Using a snapshotting strategy as described above and further herein can minimize overhead when creating snapshots by creating a snapshot record and relying on copy-on-write for changes. In addition, using a snapshotting strategy as described above and further herein can minimize overhead when modifying files in the current volume by allowing dependencies between the snapshots. Moreover, using a snapshotting strategy as described above and further herein can minimize overhead when deleting snapshots as well as the snapshot management record information is kept to a low level. Furthermore, for example, using a snapshotting strategy as described above and further herein can allow for snapshotting files even when connectivity issues may exist with a data store that physically stores the file(s), as much of the snapshotting is done by updating metadata, as described, and a file volume can determine whether the file has been previously snapshotted based on a current snapshot identifier and/or a snapshot identifier possibly stored in metadata for the file.

Referring now to FIG. 1, a block diagram of a data network 100 may include a client device 102 in communication with a network file management system 110. The client device 102 may execute the network file management client 104 to connect to a network file management system 110 via a data network connection 106, to create or manage snapshots of the network file management system 110 or portions thereof, etc. The network file management client 104 may be a separate application or integrated into an operating system or an internet browser platform at the client device 102. The network file management system 110 may refer to a single server or a distributed set of servers that may access a cloud data set, such as a server farm. The data network connection 106 may be an internet connection, a wide area network connection, a local area network connection, or other type of data network connections. The network file management client 104 may access and/or manipulate one or more data files 112 stored in the network file management system 110 according to a multi-tier volume storage structure that stores directory metadata 122, file metadata 132, and one or more shards 142 in separate or distinct volumes. In some implementations, a volume may correspond to storage space storing a specific type or types of data. In another example, the network file management client 104 may be configured to snapshot the network file management system 110 and/or associated directory volume(s) 120, as described herein. In one example, one client device 102 may execute file management client 104 to perform a snapshot, and another client device 102 may execute another instance of a file management client 104 to access files (e.g., submit file access requests) on the network file management system 110.

For example, the network file management client 104 may allow a user to access one or more data files 112 stored at the network file management system 110 and/or perform a read operation or a write operation on the one or more data files 112 over a network. For example, a read operation may send a copy of the data stored in the one or more data files 112 to the client device 102. A write operation may create or delete the one or more data files 112 and/or enters changes to the one or more data file 112 as stored in the network file management system 110.

The network file management system 110 may include a multitier volume storage structure that permits independent scaling of individual tiers. The individual tiers may store file-specific information unique to the individual tier, allowing seamless scaling or additions to the individual tier as dictated at least by load requirements. For instance, the network file management system 110 may include one or more directory volumes 120, one or more file volumes, and/or one or shard volumes 140, each storing distinct file information in a partitioned manner. In particular, the one or more directory volumes 120 may store directory metadata 122 associated with the one or more data files 112. The one or more file volumes 130 may store file metadata 132 associated with the one or more data files 112. The one or more shard volumes 140 may store one or more shards 142 or file partitions that each contain at least a portion of the one or more data files 112.

The network file management system 110 may include a multitier snapshotting component 150, which may be configured to snapshot one or more directory volumes 120 of the network file management system 110 (and/or one or more associated file volumes 130, shard volumes 140, etc., in some examples). As described further herein, multitier snapshotting component 150 can create a snapshot of one or more directory volume(s) 120 to create one or more snapshot directory volumes 160, which may have snapshot directory metadata 162 that can be used to track files modified from the directory volume(s) 120 since the snapshot represented by the snapshot directory volume(s) 160 (e.g., and/or until a subsequent snapshot is made). In one example, multitier snapshotting component 150 may additionally or alternatively snapshot the file volume(s) 130 to create snapshot file volume(s) 170 and/or snapshot the shard volume(s) 140 to create snapshot shard volume(s) 174 for tracking the files modified from the directory volume(s) 120, where snapshot file volume(s) 170 may also have snapshot file metadata 172 and snapshot shard volume(s) 174 may have snapshot shard metadata 176. In addition, network file management system 110 may include various services to operate and manage the volumes and/or their snapshot equivalents, including a directory volume service 180 for the directory volume 120 and/or snapshot directory volume, a file volume service 182 for the file volume 130 and/or snapshot file volume 170, and/or a shard volume service 184 for the shard volume 140 and/or snapshot shard volume 174.

In some implementations, the client device 102 may include any mobile or fixed computer device, which may be connectable to a network. The client device 102 may be, for example, a computer device such as a desktop or laptop or tablet computer, a server, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Aspects described herein can support snapshot of an entire directory volume with all files on that volume. From a user perspective this can appear as a share snapshot. For a backup scenario, multiple snapshots per volume can be supported. Snapshots in this scenario can be created and deleted often so snapshot creation and deletion can have minimum impact on existing workloads. For data protection, long leaving snapshots can be supported. Over long life time these snapshots can accumulate large difference area between one another. Aspects are described herein mainly with reference to a three-tier scale out; however, similar mechanisms can be applied to two-tier scale outs where some layers can be collapsed, as described herein.

Figure 2:
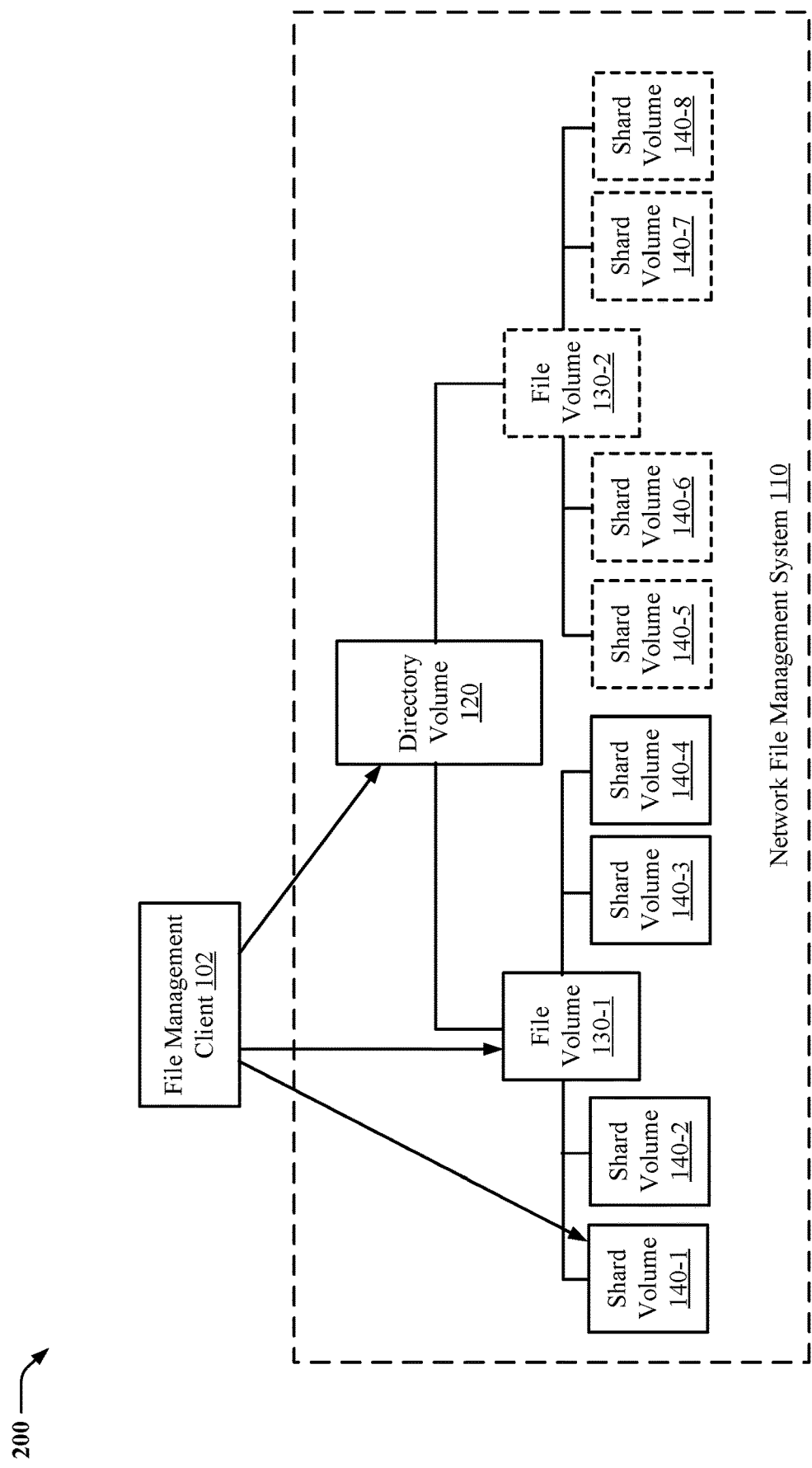
FIG. 2 is a block diagram of an example three-tier volume storage structure in accordance with one or more implementations of the present disclosure.

Referring now to FIG. 2, an example three-tier volume storage structure 200 of the network file management system 110 may permit scaling across multiple storage clusters and in a heterogeneous storage environment. The three-tier volume storage structure 200 may include at least one directory volume 120 (e.g., first tier), one or more file volumes 130-1 and 130-2 (e.g., second tier), and one or more shard volumes 140-1 to 140-8 (e.g., third tier). The directory volume 120 may be in communication with both file volume 130-1 and file volume 130-2. File volume 130-1 may be in communication with or may be used to access shard volumes 140-1 to 140-4. File volume 130-2 may be in communication with or may be used to access shard volumes 140-5 to 140-8. The three-tier volume storage structure 200 may split the directory metadata 122 from the file metadata 132 and shard file content/data (e.g., one or more shards 142). In other words, the directory metadata 122, the file metadata 132, and the file content/data (e.g., shards 142) may be extracted and/or partitioned from the one or more data files 112 and stored in separate tiers.

For example, the at least one directory volume 120 may be configured to store the directory metadata 122. Specifically, the at least one directory volume 120 may store, for each file, file names, organize files into directories, place files on the one or more file volumes 130-1 and 130-2 using a hash function and points to them using a file identifier, create persistent reference to files on the one or more file volumes 130-1 and 130-2, may be aware of file attributes and/or file sizes, directory opportunistic locks (Oplocks), may enforce quotas (e.g., related to disk storage space), etc.

The one or more file volumes 130-1 and 130-2 may be configured to provide storage of the file metadata 132. Specifically, the files may be addressable by a file identifier unique to each file of the one or more data files 112. Further, multiple file volumes 130-1 and 130-2 may be grouped together using a hash function that allows load balancing of files across the file volumes 130-1 and 130-2. The one or more file volumes 130-1 and 130-2 may be considered a master store of information about the file. Specifically, the one or more file volumes 130-1 and 130-2 may store, for each file, the file identifier, file size, file security descriptor, shards table including a shard volume identifier and shard identifier used to access the individual shards 142 or data partitions that form the file, file attributes such as, but not limited to FILE_ATTRIBUTE_READONLY, FILE_ATTRIBUTE_ARCHIVE, FILE_ATTRIBUTE_COMPRESSED, FILE_ATTRIBUTE_INTEGRITY_STREAM, FILE_ATTRIBUTE_NO_SCRUB_DATA, and FILE_ATTRIBUTE_SPARSE_FILE, timestamps including at least one of create time, last access time, and/or last modification time.

The one or more file volumes 130-1 and 130-2 may also be configured to place and rebalance file shards 142 across the one or more shard volumes 140-1 to 140-8. Further, the one or more file volumes 130-1 and 130-2 may be configured to handle and/or resolve file sharing between volumes and/or devices. Additionally, advisory byte range locks may be determined and set by the one or more file volumes 130-1 and 130-2. The one or more file volumes 130-1 and 130-2 may also establish Oplocks to back the file metadata 132 cache on the client.

The one or more shard volumes 140-1 to 140-8 may be configured to provide storage for the shards 142 or partitioned data from the one or more data files 112. For instance, the one or more shard volumes 140-1 to 140-8 may provide available (free) space for the one or more file volumes 130-1 and 130-2 to store the shards 142 or partitioned data from the one or more data files 112. The valid data length (VDL) may be tracked for each shard 142. Further, the one or more shard volumes 140-1 to 140-8 may be aware of at least one file attribute including, but not limited to, FILE_ATTRIBUTE_READONLY, FILE_ATTRIBUTE_ARCHIVE, FILE_ATTRIBUTE_COMPRESSED, FILE_ATTRIBUTE_INTEGRITY_STREAM, FILE_ATTRIBUTE_NO_SCRUB_DATA, and FILE_ATTRIBUTE_SPARSE_FILE. The one or more shard volumes 140-1 to 140-8 may include mandatory byte range locks and/or Oplocks to back data cache on the client.

The volumes may be hierarchically ordered according to a manner of file content access. For instance, the at least one directory volume 120, or first tier, may be logically arranged ahead of the one or more file volumes 130-1 and 130-2 (second tier), and in turn, the one or more file volumes 130-1 and 130-2 may be logically arranged ahead of the one or more shard volumes 140-1 to 140-8 (third tier). As such, when a user attempts to access or perform a read/write operation associated with a file at the network file management system 110 using the file management client 104, the file management client 104 may first access the first tier, or the at least one directory volume 120. Using the directory metadata 122 associated with the file at the directory volume 120, the user may then access a file volume, or the second tier, storing the file metadata 132 associated with the file. For instance, the particular file the user desires to access may be stored at shard volume 140-7 as one or more shards 142 or file partitions. Accordingly, the user may use the file metadata 132 located at file volume 130-2 to then access shard volume 140-7 so as to access the one or more shards 142 or file partitions associated with the desired file.

Figure 3:
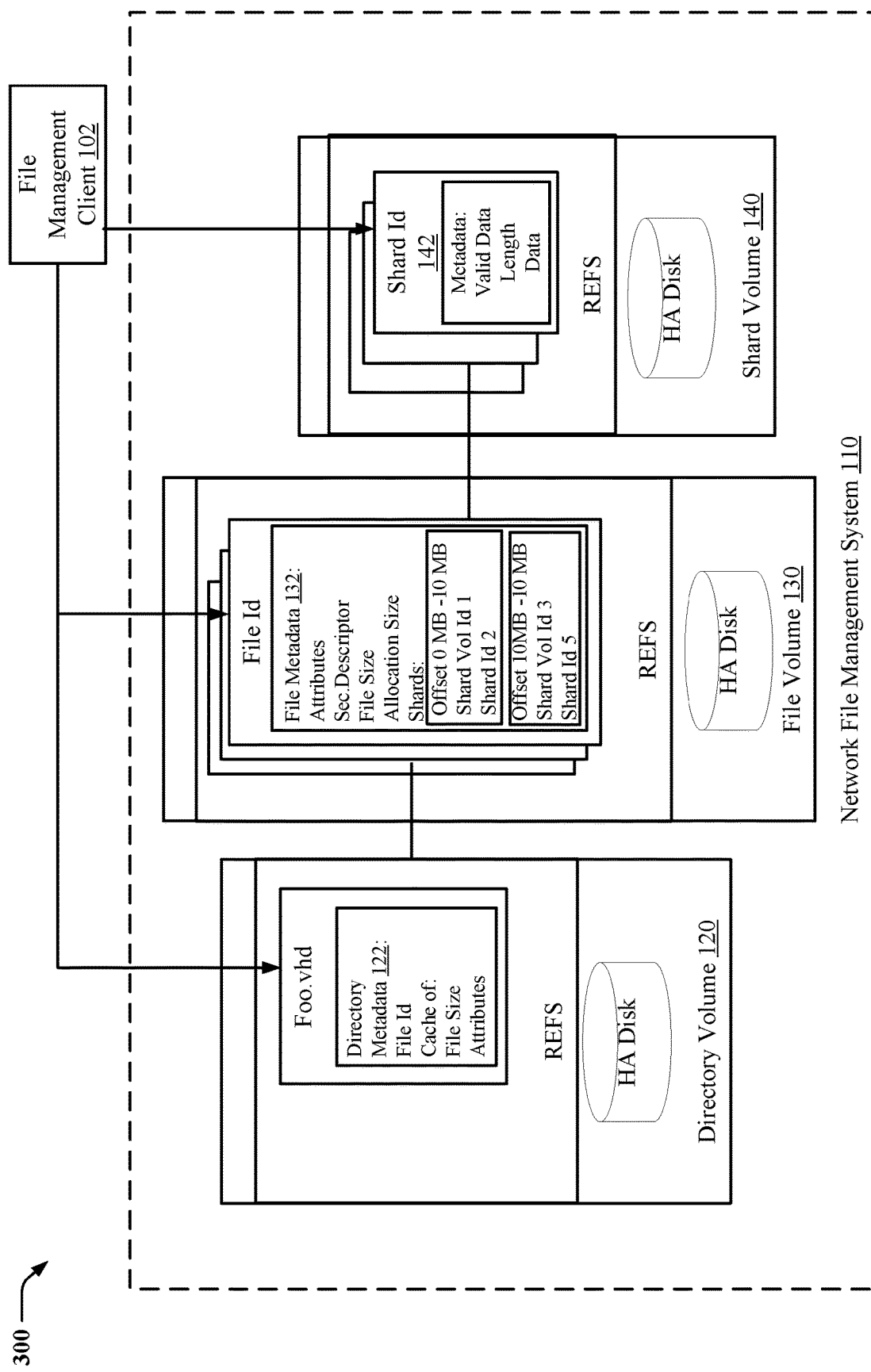
FIG. 3 is a conceptual diagram of a file partitioning scheme using a three-tier volume storage structure in accordance with one or more implementations of the present disclosure.

Referring now to FIG. 3, a file partitioning scheme 300 using a three-tier volume storage structure at the network file management system 110 is shown. Each tier, which may include one or more volumes, may include one or more resilient file system (REFS) roles. For example, at the directory volume 120 (e.g., first tier), REFS may implement a user visible directory structure which may be used when handling a number of file operations including, but not limited to, open, rename, delete, close, and/or when propagating the file metadata 132 from the file volume 130 to the directory cache. Further, at the file volume 130 (e.g., second tier), REFS may maintain metadata of or about each file and/or file shard assignments, which may be used when handling a number of file operations including, but not limited to, open, delete, set end-of-file (EOF) or allocation size, set file attributes, and/or close.

Additionally, at the shard volume 140 (e.g., third tier), REFS may correspond to a sub-locator that assists to allocate and manage shards 142 on a disk, rather than writing or implementing a separate or distinct allocator that would subdivide disk space to shards 142. Moreover, accessing shards 142 as files may provide a convenient file interface that may be used for cutting access to the storage on layout revocation by invalidating existing file opens, deleting the file during garbage collection of unused shards 142 and/or relying on REFS to lazily grow a file or files that represent the shard 142 as application writes to the shard 142.

Metadata scaling at the directory volume 120 and/or the file volume 130 may be accomplished by splitting the directory metadata 122 from the file metadata 132 so that IOPS may be distributed across multiple volumes, and metadata file cache across multiple machines/devices. As such, the directory metadata 122 and the file metadata 132 may scale independently. With respect to data scaling and free space aggregation at the shard volume 140, placing data on different volumes than metadata, and sharding a file's data across multiple volumes may assist with distributing TOPS across a much larger set of disks providing a large total throughput on what appears to the user to be a single share. Additionally, file sharding may assist with providing single free space instead of having per volume islands of free space.

As an example, to read/write data on the network file management system 110, the file management client 104 may open the file (e.g., Foo.vhd) on the directory volume 120 (e.g., which may correspond to a directory server) and query a file layout. The file layout may include the file identifier (e.g., File Id) the file volume 130 that hosts metadata for the file. The file layout may also include a cache of the file size and one or more attributes. The user may then, via the file management client 104, open the file metadata 132 (e.g., File Id) on the file volume 130 and query file layout to provide one or more shard volume identifiers and corresponding shard identifiers 142. The shard volume identifier may identify a shard volume where the one or more shards 142 are located. The shard identifier may identify the one or more shards 142 within the shard volume that contain the file. Each shard 142 may be of a fixed or variable size. Further, the file metadata 132 may include one or more attributes, a file security descriptor, a file size, an allocation size, and shard information. For each shard 142 in the file layout, the file management client 104 may open the shard 142 on the shard volume 140 and perform read/write operations.

Figure 4:
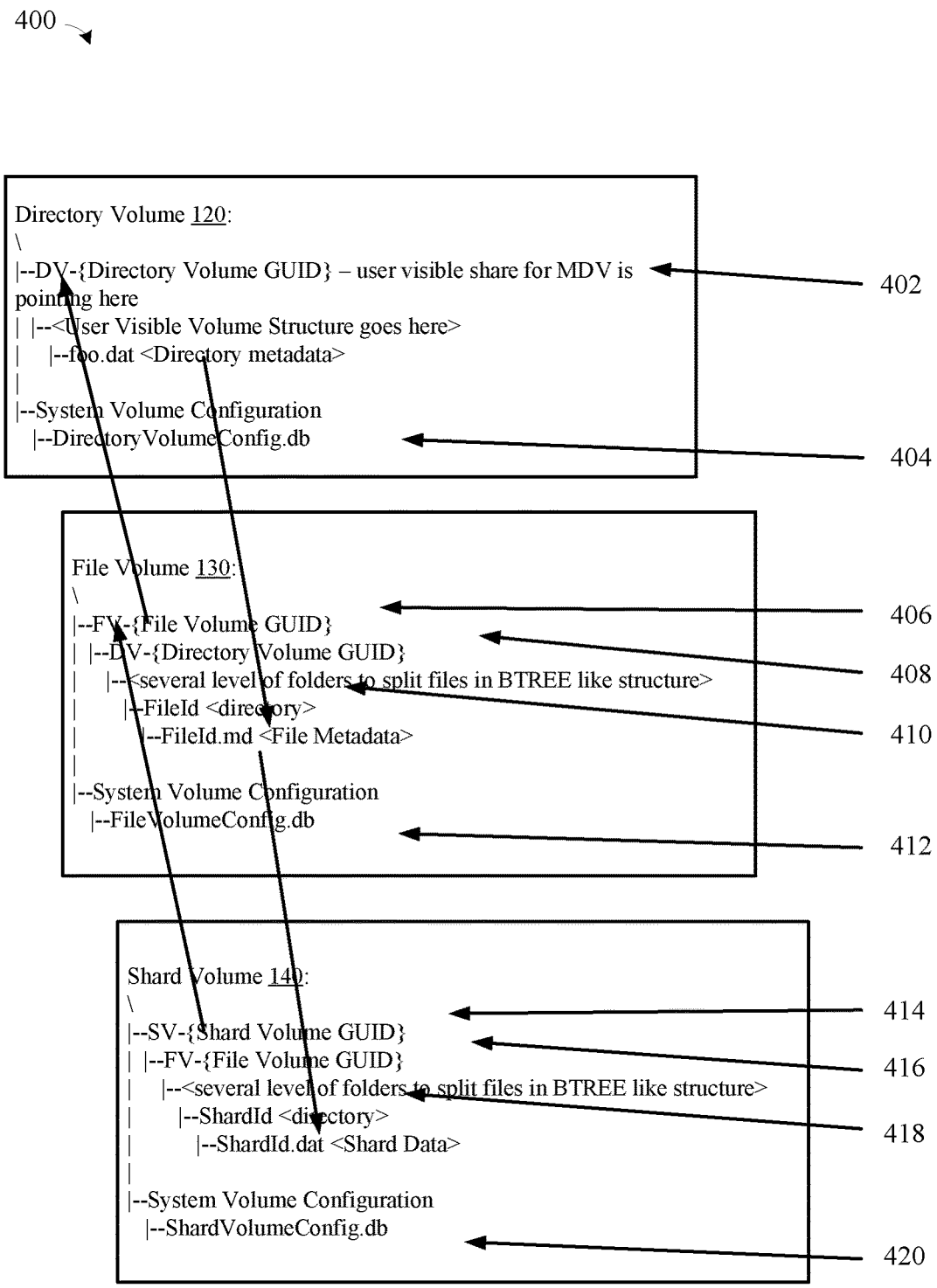
FIG. 4 is an example physical volume directory layout of the three-tier volume storage structure in accordance with one or more implementations of the present disclosure.

Referring now to FIG. 4, an example physical volume directory layout 400 of the three-tier volume storage structure may lay out logical entities such as the directory volume 120, file volume 130, and/or shard volume 140 on top of a physical entity (e.g., physical volume). The physical volume directory layout 400 may define bindings of the logical entities between each other. In some implementations, a physical volume may be a physical storage space and a logical volume may be a virtual or software defined storage space within a physical volume.

For example, at 402, every directory volume 120 may have a distinct or independent directory so as to permit collocating multiple roles on the same physical volume. At 404, directory volume(s) 120 hosted by the physical volume may be defined, and bindings between the directory volume(s) 120 and file volume(s) 130 may be included. Directory volume file system mini-filter may attach to the volume if the physical volume contains any directory volume(s) 120.

Further, at 406, every file volume 130 may have a distinct or independent directory to permit collocating multiple roles on the same physical volume. At 408, every directory volume 120 may have a distinct or independent directory to permit quick location of all files placed by the given directory volume 120. At 410, file to directory ratio may be controlled. At 412, file volume(s) 130 hosted by the physical volume may be defined, and contains bindings between the file volume(s) 130 and shard volume(s) 140 as well as bindings between directory volume(s) 120 and file volumes 130. File volume file system mini-filter may attach to the volume if the physical volume contains any file volume(s) 130.

At 414, every shard volume 140 may have a distinct or independent directory to permit collocation of multiple roles on the same physical volume. At 418, every file volume 130 may have a distinct or independent directory to allow quick location all files placed by the given file volume 130. At 420, file to directory ratio may be controlled. At 422, Defines shard volume(s) hosted by the physical volume may be defined, and bindings between these shard volume(s) 140 and file volume(s) 130 may be included. Shard volume file system mini-filter may attach to the volume if the physical volume contains any shard volume(s) 140.

In some implementations, a single physical volume can contain multiple logical directory volume(s) 120. Further, each directory volume 120 can be associated with multiple file volume(s) 130. In some implementations, a single physical volume can contain a single data or shard volume 140. Moreover, a data or shard volume 140 can be associated with multiple metadata or file volume(s) 130.

Figure 5:
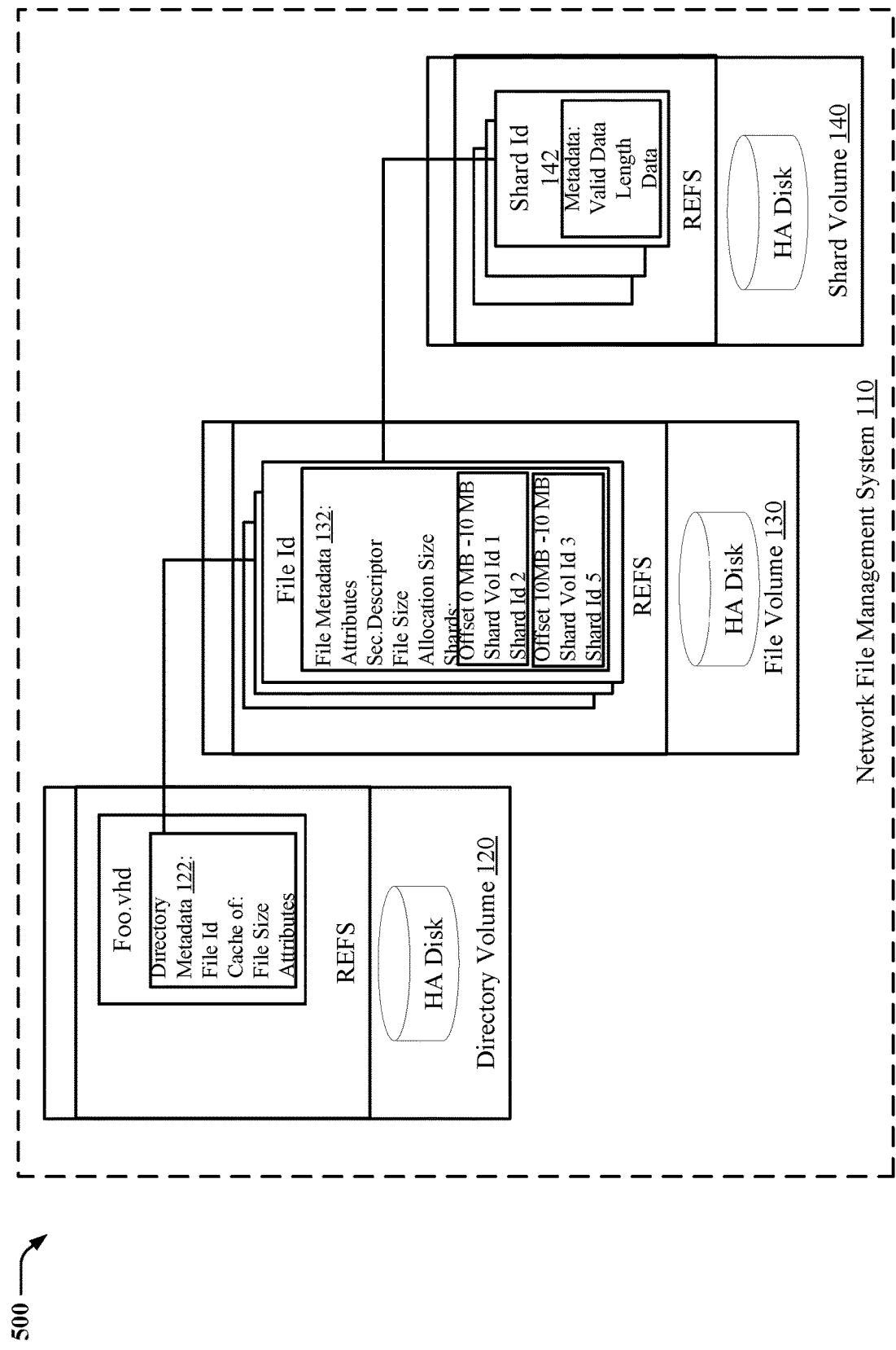
FIG. 5 is conceptual diagram of the three-tier volume storage structure represented in a hierarchical manner in accordance with one or more implementations of the present disclosure.

Referring now to FIG. 5, the three-tier volume storage structure may include a hierarchical representation 500 of the network file management system 110. At a first tier, the directory volume 120 may include the directory metadata 122 used for accessing the file metadata 132 at the corresponding file volume 130. For example, using at least the file identifier of the file metadata 132, a location of the file metadata 132 at the file volume 130 may be determined based on the directory metadata 122. At a second tier, the file volume 130 may include the file metadata 132 used for accessing the one or more shards 142 storing the file data. For instance, the file metadata 132 at the file volume 130 may include at least a shard volume identifier that identifies the shard volume 140 storing the file data, or shards 142, and the location of the one or more shards 142 within the shard volume 140 containing the file data based on a shard identifier.

At a third tier, the shard volume 140 may include the one or more shards 142 storing the file data/content. In some implementations, the shard size, or in other words, the size of the individual shards may be fixed or variable. That is, each shard may be of the same size (e.g., in megabytes (MB), gigabytes (GB), or another unit of memory size) or may be of different sizes between the one or more shards 142. Further, a shard size may increase as the file size increases. For example, for a first storage size (e.g., 100 GB), the shard size, or each individual shard may be a first size (e.g., 10 MB). Subsequently, or for a second storage size (e.g., greater than 100 GB), the shard size, or each individual shard may be a second size (e.g., 100 MB) greater than the first size. By increasing the shard size, a number of records in a run table that identifies each individual shard may be decreased.

Figure 6:
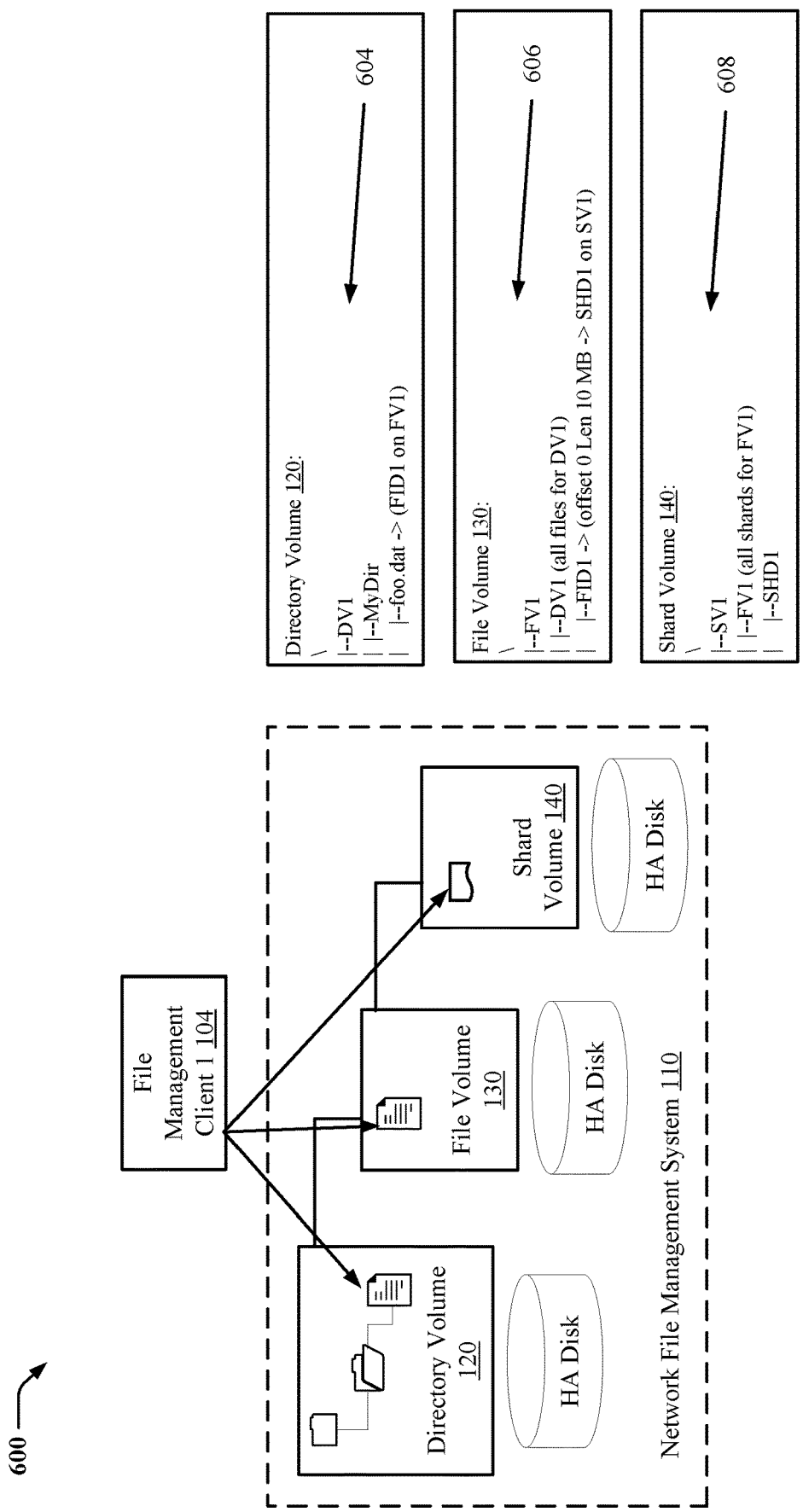
FIG. 6 is a block diagram of creating a file/shard in a multitier volume storage structure in accordance with one or more implementations of the present disclosure.

Referring now to FIG. 6, an example of a file access 600 is illustrated, where file management client 1 104 can initiate a file access request, which may include opening a file, adding the file, modifying the file, storing the modified file, and/or the like. File management client 1 104 can add the file and/or a shard for the file, which can result in modifications to file metadata in the directory volume 120, file volume 130, and shard volume 140 in the network file management system. For example, as shown, metadata 604 for the file can be added to the directory volume 120 (e.g., as directory metadata 122), where the metadata may include the directory volume identifier (DV1), a folder structure for the file (e.g., in folder "MyDir"), a file name (e.g., "foo.dat"), and a pointer to file information in the file volume 130, such as a file volume identifier "FV1" and a file identifier "FID1." For example, as shown metadata 606 for the file can be added to the file volume 130 (e.g., as file metadata 132), where the metadata can include a file volume identifier "FV1," a directory volume identifier "DV1" for all files in FV1 that belong to DV1, a file identifier "FD1," and one or more pointers to shards on one or more shard volumes (e.g., offset 0 len 10 MB→SHD1 on SV1), where the shards make up the file. For example, as shown metadata 608 for the file can be added to the shard volume 140 (e.g., as shard data 142), where the metadata can include a shard volume identifier "SV1," a file volume identifier "FV1" for all shards in SV1 that belong to files in FV1, and a shard identifier "SHD1." This metadata can be used to reference the files and portions thereof for accessing the files via network file management system 110. In addition, for example, this metadata can be used to create and manage snapshots of the network file management system 110, as described in further detail herein.

Figure 7:
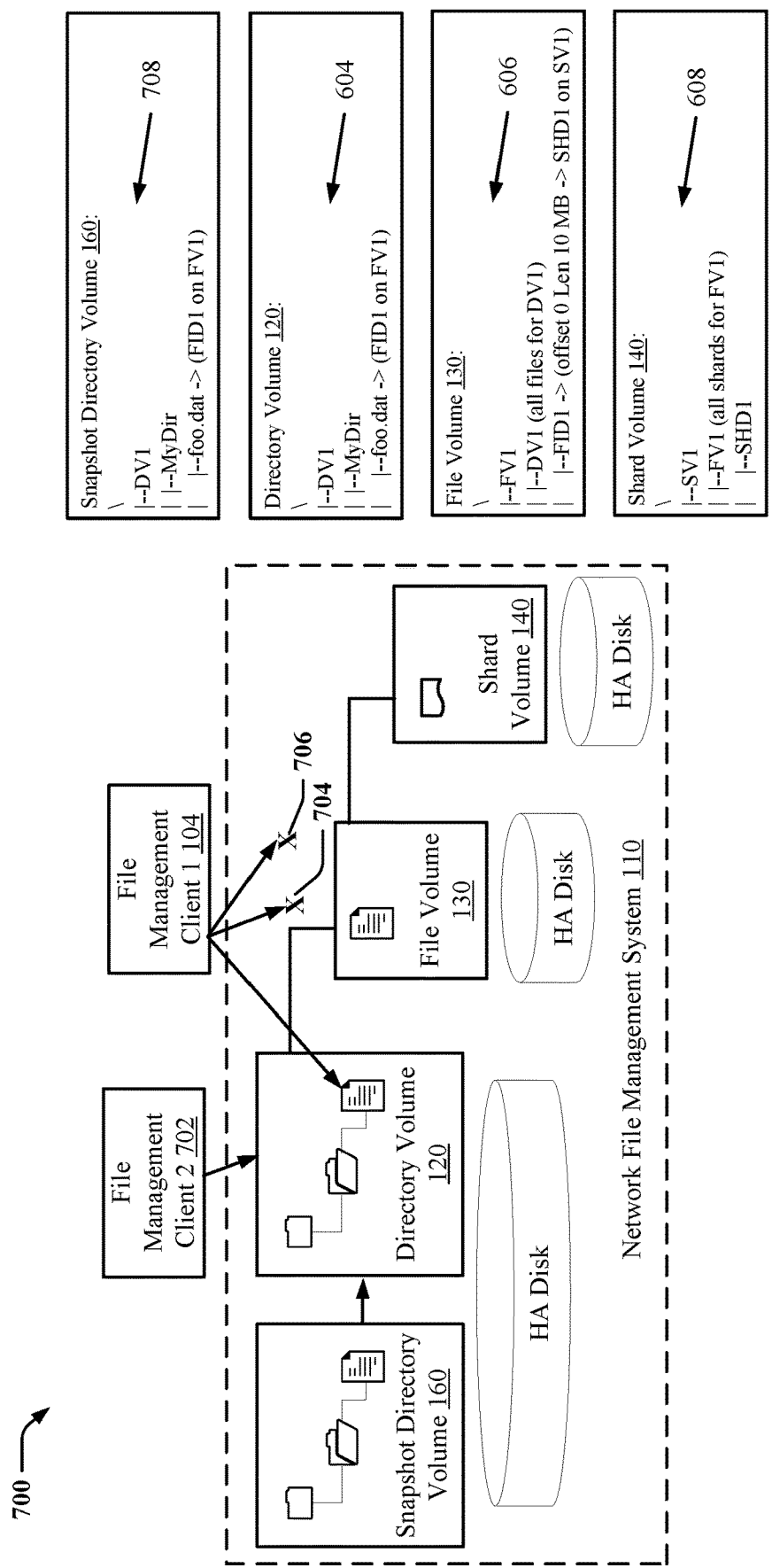
FIG. 7 is a block diagram of creating a snapshot of a directory volume in accordance with one or more implementations of the present disclosure.

Referring now to FIG. 7, an example of a snapshot 700 is illustrated, where file management client 2 702 can initiate creating a snapshot of directory volume 120. In this example, multitier snapshotting component 150 can, based on receiving the snapshot request from file management client 702, block access requests on the directory volume 120 until snapshotting is complete. For example, multitier snapshotting component 150 can block request 704 for file layout and/or request 706 for shard layout (e.g., by notifying file management client 1 104 of the blocking until snapshotting is complete). FID1 and SHD1 can be added to the network file management system 110 as described with reference to FIG. 6, along with metadata 604, 606, 608.

In addition, based on receiving the request to create the snapshot, multitier snapshotting component 150 can create a snapshot directory volume 160 that can reference directory volume 120 for file information, and can have separate metadata to track changes based on a copy-on-write mechanism, as described. For example, a volsnap service can be used for copy-on-write on the directory volume, where the volsnap service can recognize files being accessed and can make backup copies of the files based on access requests. In this example, multitier snapshotting component 150 can create metadata 708 for the snapshot directory volume 160 that includes the metadata of directory volume 120 (e.g., as snapshot directory metadata 162), pointing to the same file information. This can represent a snapshot of the directory volume 120 before further changes are made to the directory volume 120. Any changes can be journaled, as described herein, for undoing when recalling the snapshot directory volume 160. In addition, a snapshot identifier (e.g., "SN1") can be assigned to the snapshot directory volume 160. In an example, the snapshot identifier may be an integer that is incremented for each snapshot, such that the snapshots can be temporally identified.

In any case, once the snapshot is complete (e.g., once snapshot directory volume 160 is created with associated metadata 708), multitier snapshotting component 150 can unblock client requests, which may include accepting subsequent requests, replying to requests made while multitier snapshotting component 150 was blocking requests (e.g., requests 704, 706), and/or the like. In an example, multitier snapshotting component 150 can include a highest snapshot identifier for the directory volume 120 in replying to requests. This identifier can be subsequently used, as described herein, to determine whether a file has been snapshotted (e.g., for a file access request).

Figure 8:
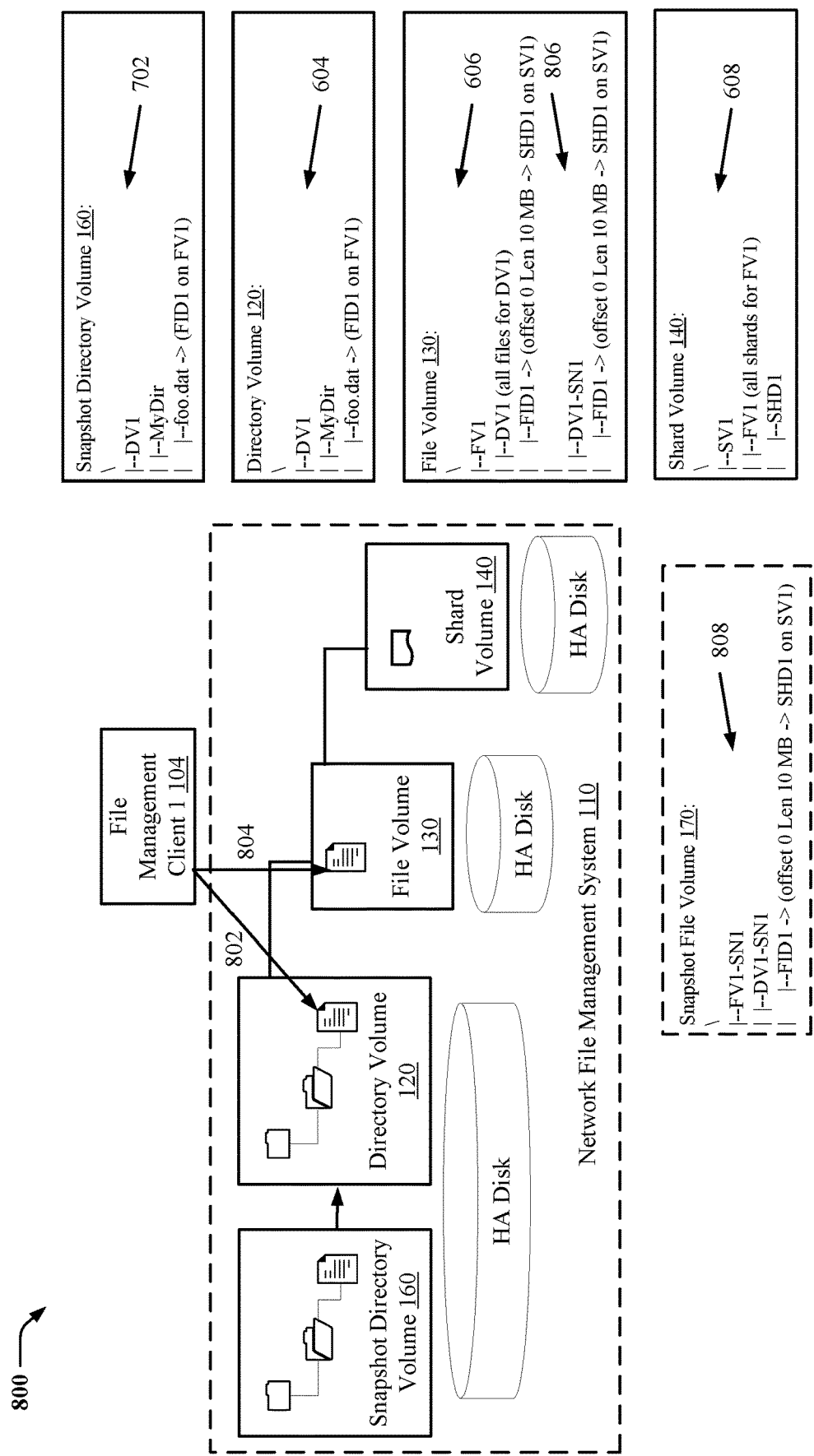
FIG. 8 is a block diagram of accessing a file in a snapshotted multitier volume storage structure in accordance with one or more implementations of the present disclosure.

Referring now to FIG. 8, an example of a file access request 800 is illustrated, where file management client 1 104 can initiate a file access request via directory volume 120 for a file in file volume 130, where directory volume 120 has been snapshotted to snapshot directory volume 160. The file access request may correspond to a request to access the file for potential modification thereof, or otherwise a request for the file layout within the network file management system 110, e.g., as a collection of shards in one or more shard volumes, and/or the like. In this example, file volume service 182 can detect the file access request from the file management client 1 104 based on a request 802 to the directory volume 120 and/or based on a request 804 to the file volume 130 (e.g., from the directory volume 120).

In this example, based on detecting the file access request, file volume service 182 can determine whether the file was snapshotted (e.g., via a copy-on-write mechanism), which may include determining whether the file has associated snapshot metadata (e.g., a snapshot identifier). If not, file volume service 182 can copy the file metadata 606 for the snapshot directory volume 160, shown as metadata 806 for DV1-SN1 (e.g., as snapshot file metadata 172), as part of the copy-on-write. In addition, file volume service 182 can record a snapshot identifier SN1 in the metadata for the file identifier FID1 indicating that FID1 is snapshotted up to the snapshot identifier SN1. In another example (e.g., instead of or in addition to recording metadata 806), file volume service 182 can generate a snapshot file volume 170 of file volume 130, and associated metadata 808, for the file based on the file access request 804. In an example, file volume service 182 can also copy a snapshot file (e.g., content thereof) corresponding to file FID1 in a separate folder that can be unique to the snapshot directory volume 160 for accessing of the snapshot file when recalling the snapshot.

For example, the copy-on-write can be crash safe using a process similar to the following. If modification of file metadata is observed and snapshot identifier on the file indicates that the file metadata is not cloned in the latest snapshot, then if FID in the snapshot directory volume 160 exists and has correct snapshot identifier then the file metadata was copied in the snapshot directory volume 160, and the snapshot identifier in the file metadata for FID on file volume 130 can be updated to indicate that the snapshot completed. If the FID does not exist in the snapshot directory volume 160 or does not have the correct snapshot identifier, a FID entry can be created in the latest snapshot directory volume, file metadata for FID, including a shard table (e.g., shards run table), can be copied to the file in the snapshot directory volume, snapshot identifier can be set in the snapshot FID, e.g., in metadata 806 (which can indicate copy completed), and snapshot identifier can be set in the original FID, e.g., in metadata 606 (which can indicate that file cloned successfully to the snapshot with this snapshot identifier). If any of these steps fail, modification of the file metadata can fail as well. If there are existing snapshot opens on the original FID, these can be invalidated to trigger reopening of the FID in the snapshot directory volume.

Figure 9:
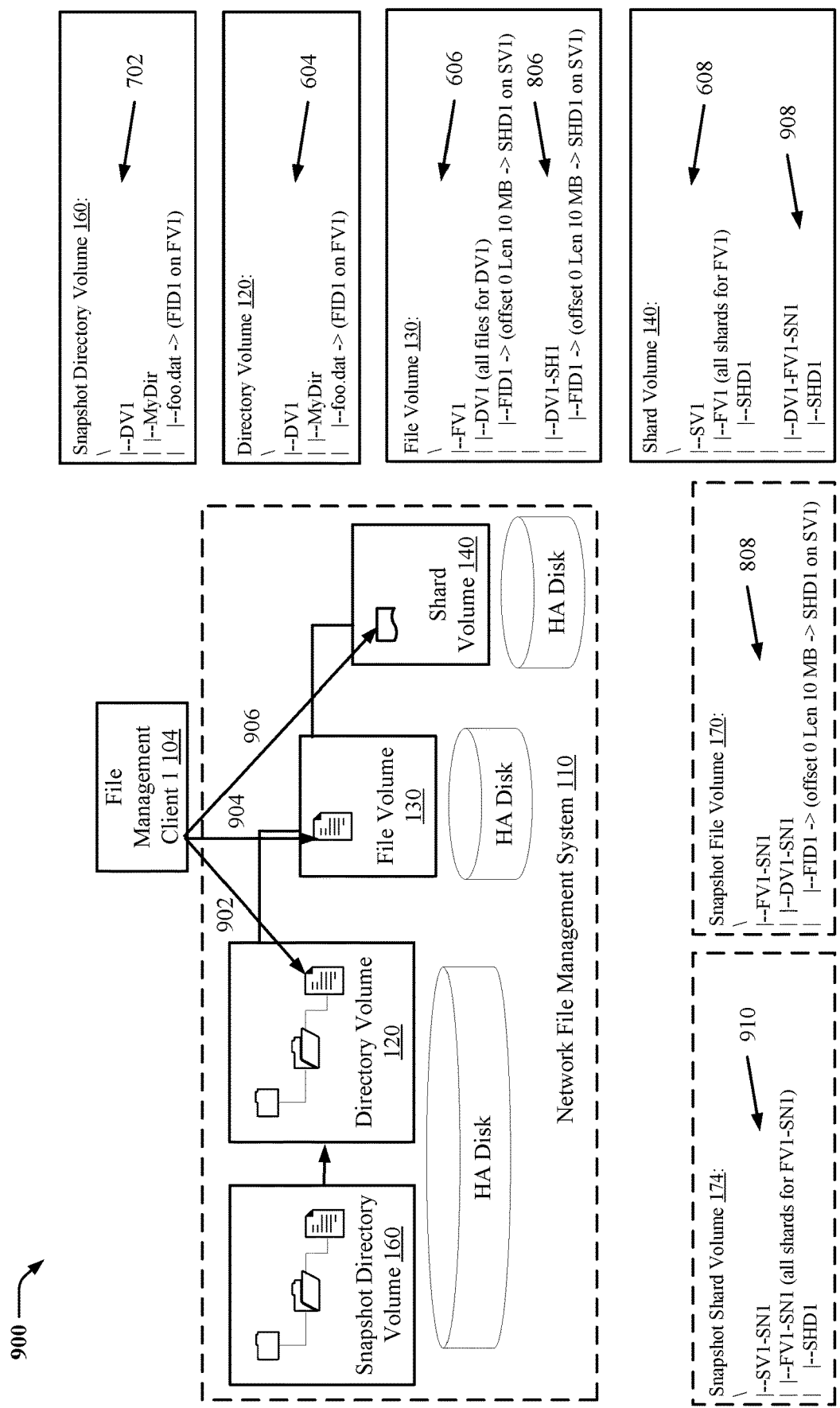
FIG. 9 is a block diagram of accessing a shard in a snapshotted multitier volume storage structure in accordance with one or more implementations of the present disclosure.

Referring now to FIG. 9, an example of a shard access request 900 is illustrated, where file management client 1 104 can initiate a shard access request via directory volume 120 for a shard of a file in file volume 130, where directory volume 120 has been snapshotted to snapshot directory volume 160. The shard access request may correspond to a request to access the shard for potential modification thereof, or otherwise a request for the shard layout within the network file management system 110, and/or the like. In this example, shard volume 140 can detect the shard access request from the file management client 1 104 based on a request 902 to the directory volume 120, based on a request 904 to the file volume 130 (e.g., from the directory volume 120), and/or based on a request 906 to the shard volume 140 (e.g., from the file volume 130). In one example, the shard access request can be in conjunction with (or following) a file access request for the file comprising the shard.

In this example, based on detecting the shard access request, shard volume 140 can determine whether the shard was snapshotted (e.g., via a copy-on-write mechanism), which may include determining whether the shard has associated snapshot metadata (e.g., a snapshot identifier). If not, shard volume 140 can copy the shard metadata 608 for the snapshot directory volume 160, shown as metadata 908 for DV1-FV1-SN1 (e.g., as snapshot shard metadata 176), as part of the copy-on-write. In addition, shard volume 140 can record a snapshot identifier SN1 in the metadata for the file identifier FID1 indicating that FID1 is snapshotted up to the snapshot identifier SN1. In another example (e.g., instead of or in addition to recording metadata 908), shard volume service 184 can generate a snapshot shard volume 174 of shard volume 140, and associated metadata 910, for the shard based on the shard access request 906. In an example, shard volume service 184 can also use a duplicating function to avoid physical copy of the shard (e.g. until a corresponding cluster of data is forked out).

For example, the copy-on-write can be crash safe using a process similar to the following. If modification of shard data is observed and snapshot identifier on the shard indicates that the shard data is not cloned in the latest snapshot, then if the shard identifier ("SHD") in the snapshot directory volume 160 exists and has correct snapshot identifier then the shard data was copied in the snapshot directory volume 160, and the snapshot identifier in the shard data for SHD on shard volume 140 can be updated to indicate that the snapshot completed. If the SHD does not exist in the snapshot directory volume 160 or does not have the correct snapshot identifier, a SHD entry can be created in the latest snapshot directory volume, a clone shard can be blocked to the snapshot shard (e.g., to share data between the shard and the shard snapshot, such that when data is modified in a cluster, the cluster is forked out), snapshot identifier can be set in the snapshot SHD, e.g., in metadata 908 (which can indicate copy completed), and snapshot identifier can be set in the original SHD, e.g., in metadata 608 (which can indicate that file cloned successfully to the snapshot with this snapshot identifier). If any of these steps fail, modification of the file metadata can fail as well. If there are existing snapshot opens on the original SHD, these can be invalidated to trigger reopening of the SHD in the snapshot directory volume.

Figure 10:
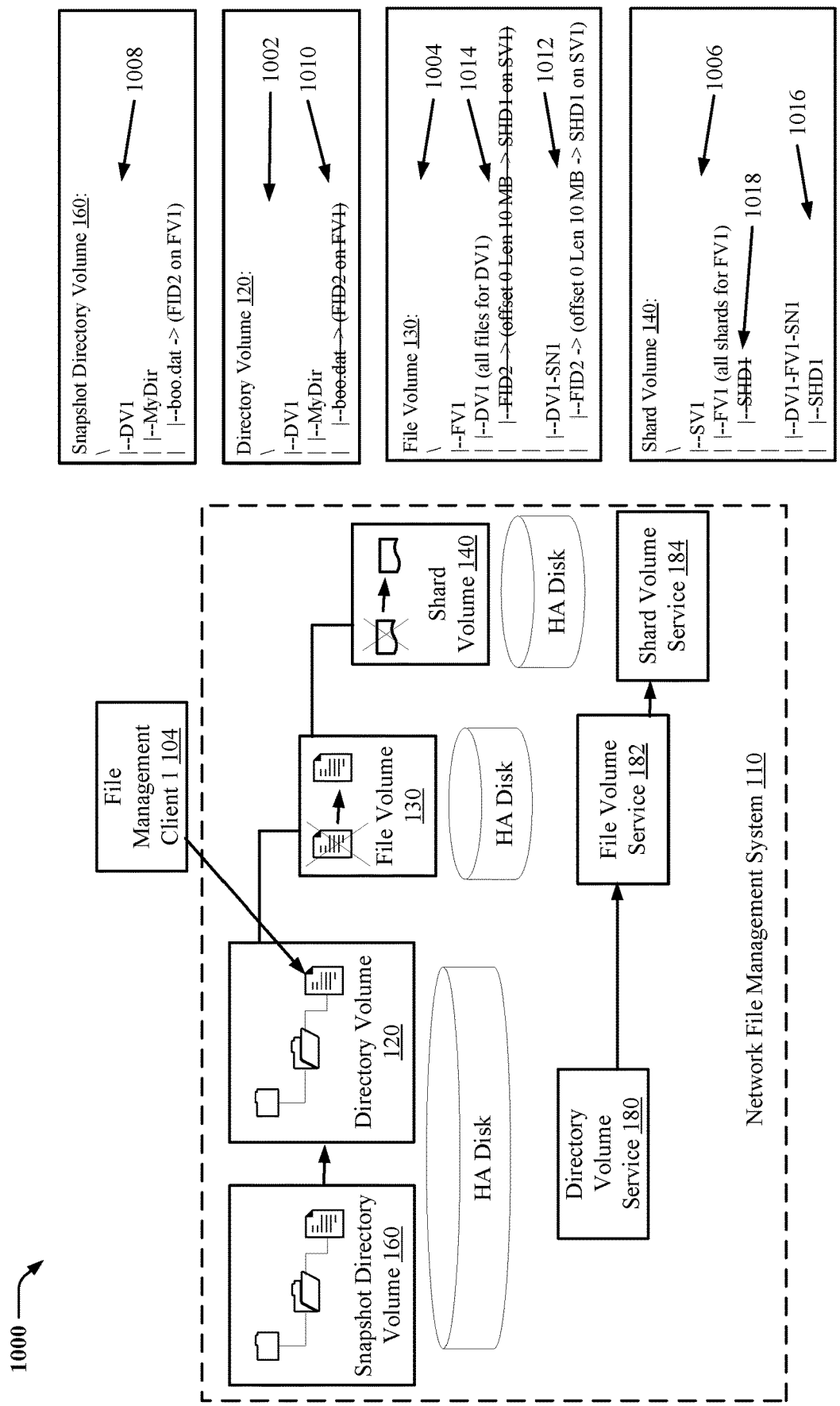
FIG. 10 is a block diagram of deleting a file/shard in a snapshotted multitier volume storage structure in accordance with one or more implementations of the present disclosure.

Referring now to FIG. 10, an example of a file deletion request 1000 is illustrated, where file management client 1 104 can initiate a file deletion request via directory volume 120 for a file in file volume 130, where directory volume 120 has been snapshotted to snapshot directory volume 160. As the file may be associated with one or more snapshots, deletion of the file from the directory volume may result in some processing on the snapshot directory volume 160. For example, file volume service 182 can determine whether there is a snapshot and whether the file is in the snapshot (e.g., whether the file has been accessed since creation of the snapshot). If so, then the file may already be snapshotted via copy-on-write, and file volume service 182 can proceed to delete the file, corresponding shards, and related metadata 1002, 1004, 1006. Where the file has not been snapshotted, however, the file can be snapshotted before deletion from the directory volume 120 so that it is retained in the snapshot. This may include creating the associated metadata, as described in FIGS. 8-9 above.

For example, directory volume 120 can have metadata 1002, file volume 130 can have metadata 1004, and shard volume 140 can have metadata 1006 all describing the file FID2. Additionally, when the snapshot directory volume 160 is created, metadata 1008 of the file FID2 can be included. Then when the file FID2 is to be deleted, for example, directory volume service 180 can write a journal record indicating to garbage collect file FID2 on the data store(s) at which it is stored, and may also delete the metadata for FID2 from directory volume 120, as shown at 1010. At some later point, the directory volume service 180 can read this journal record, and instructs the file volume service 182 that currently controls the file volume 130 to delete file FID2. The file volume service 182 can delete the FID2, copy the metadata for file FID2 in the file volume 130 to snapshot directory volume DV1-SN1, as shown at 1012, and delete the metadata for file FID2 from the file volume 130, as shown at 1014. The file volume service 182 can also journal records to delete all the file shards for FID2. At some later point, the file volume service 182 can read this journal record, and instruct the shard volume service 184 that currently controls the shard volume 140 to delete shard SHD1. The shard volume service 184 can accordingly delete SHD1 and duplicate the corresponding data to folder, duplicate the metadata for SHD1 in the shard volume 140 to snapshot directory volume DV1-SN1 for FV1 (e.g., DV1-FV1-SN1), as shown at 1016, and delete the metadata for SHD1 from the shard volume, as shown at 1018. In another example, where different snapshots are created for the file and shard (e.g., snapshot file volume 170, snapshot shard volume 174, as shown in FIGS. 8-9), this metadata can be similarly deleted.

Figure 11:
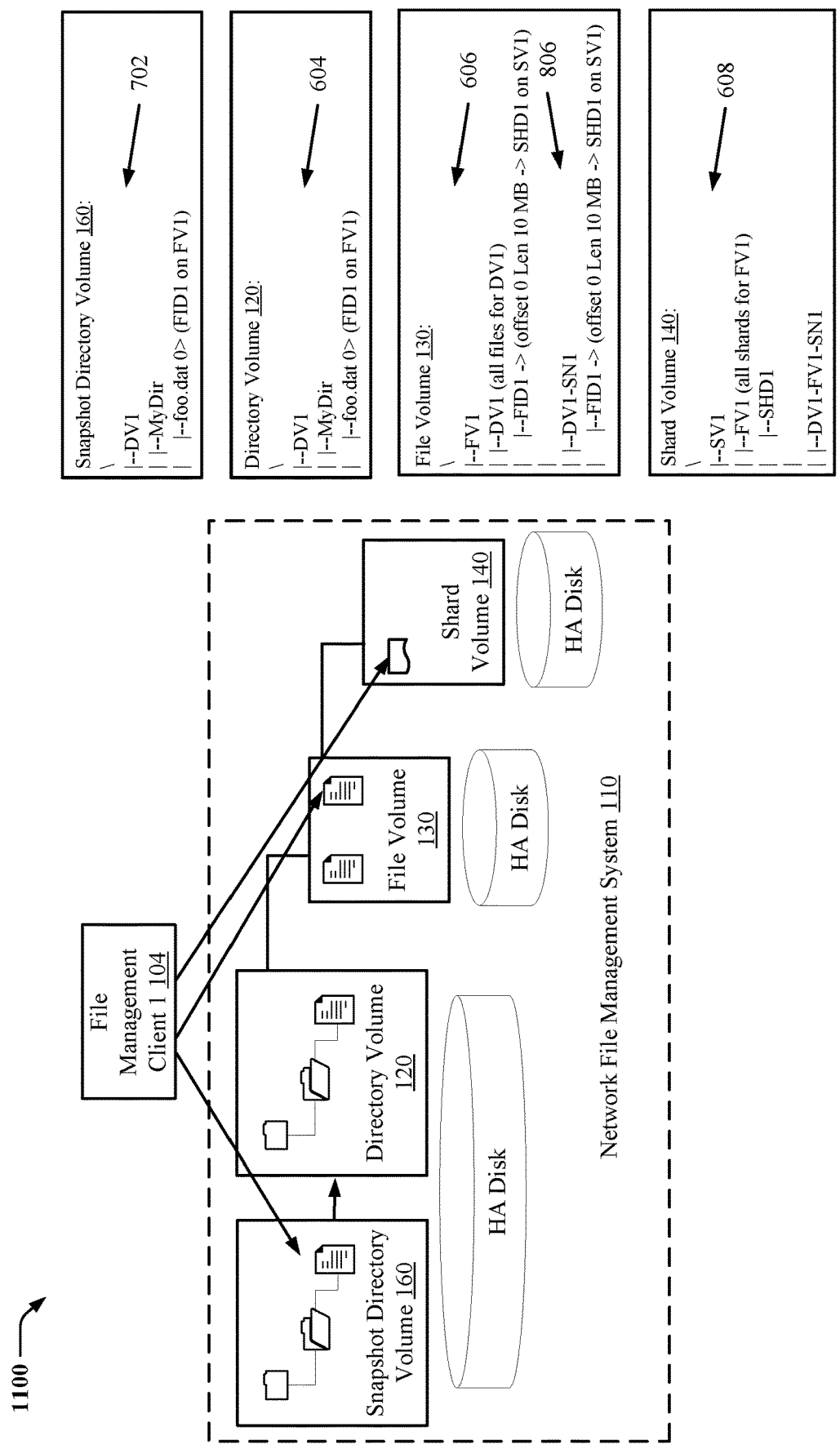
FIG. 11 is a block diagram of creating a new file in a snapshotted multitier volume storage structure in accordance with one or more implementations of the present disclosure.

Referring now to FIG. 11, an example of a request 1100 to access a file in a snapshot is illustrated, where file management client 104 can initiate a file access request. File management client 1 104 can be the same or different client as a file management client that initiates creation of the snapshot, opens files in the directory volume 120 after snapshot, etc. For example, file management client 1 104 may be a backup application that requests a snapshot version of a file that is recorded as part of a snapshot. For example, file management client 1 104 can query a file layout for a snapshot version of a file (e.g., according to a snapshot identifier). Multitier snapshotting component 150 respond to the query request based on determining file FID1 is located on FV1 of the snapshot directory volume 160 corresponding to SN1. Based on file management client 1 104 opening the file FID1 on FV1 on SN1, multitier snapshotting component 150 can determine the file metadata to be copied to the snapshot so file management client 1 104 can open a copy of the file metadata 806 for the snapshot directory volume 160. Based on this metadata, multitier snapshotting component 150 can query the shard layout to determine SHD1 on SV1 on SN1.

Multitier snapshotting component 150, in this example, can attempt to open SHD1 on SV1 on SN1. If multitier snapshotting component 150 determines that the file is not found in the snapshot folder, this can indicate that the file was not copied yet, and the access request (e.g., to open the file) can be retried on the volume and does not trigger shard copy to snapshot. If multitier snapshotting component 150 determines that the file on the volume has a snapshot identifier greater than (or otherwise indicated as being in a snapshot subsequent in time to) the snapshot identifier SN1, this can indicate that the file has not been cloned in the snapshot SN1. In this example, multitier snapshotting component 150 can read data from the file on file volume 130 for providing to the file management client 1 104.

In an example, where a non-snapshot file access request (e.g., as described in FIG. 8) open arrives to the same shard and performs file copy to a later snapshot (e.g., SN2), then at the end the file volume 130 can trigger SHD1 layout revoke, and multitier snapshotting component 150 can attempt to reopen SHD1 on SV1 on SN1 again in response to the request from file management client 1 104. This time multitier snapshotting component 150 can find shard in the snapshot and can continue reading data from the snapshot for providing to the file management client 1 104.

Figure 12:
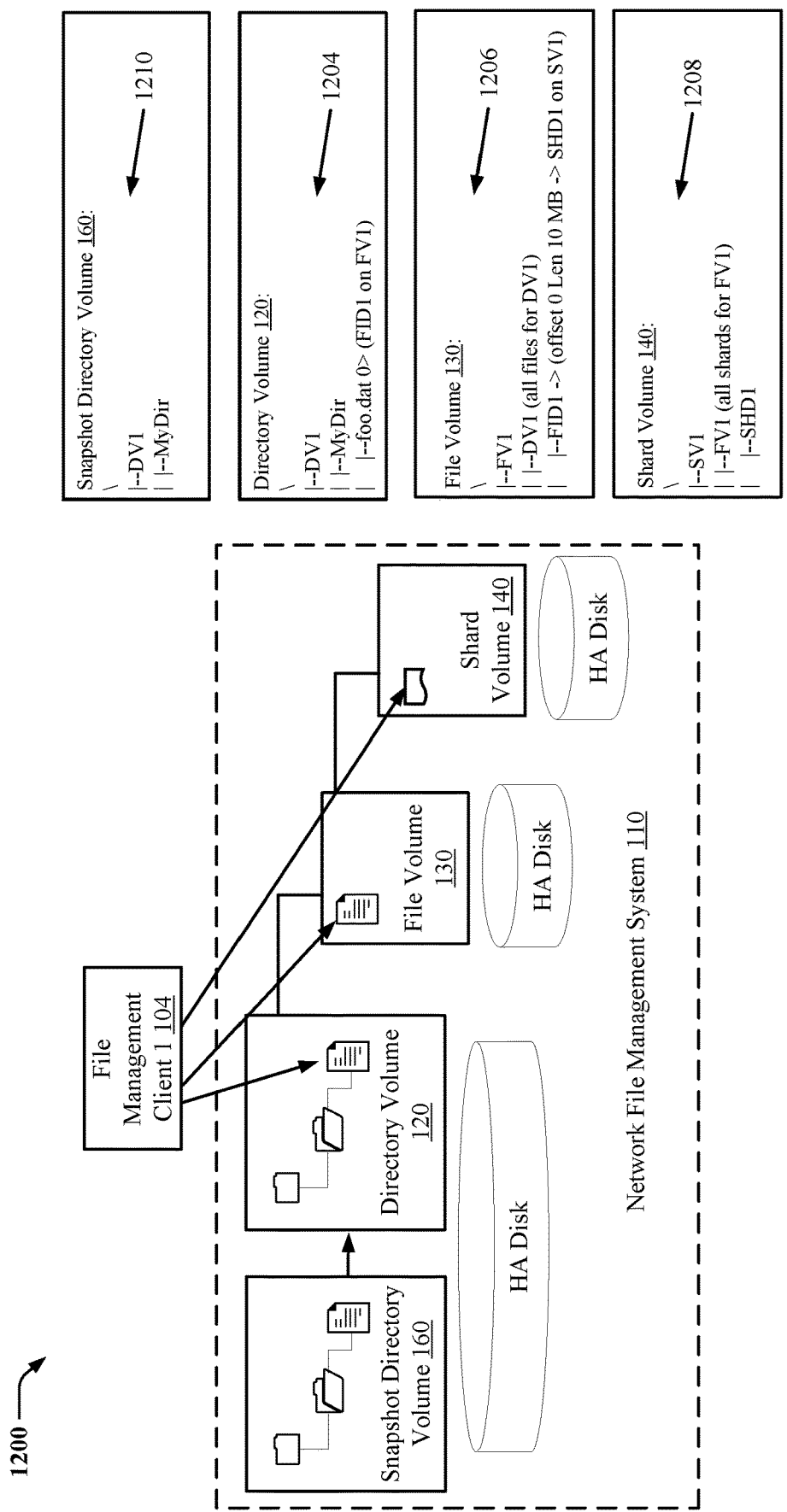
FIG. 12 is a block diagram of opening a snapshotted file/shard in accordance with one or more implementations of the present disclosure.

Referring now to FIG. 12, an example of a creating a new file 1200 after a snapshot is illustrated, where file management client 1 104 can initiate a request to create a new file on the directory volume 120. In this example, file volume 130 can ensure the new file is not added to or otherwise referenced by the snapshot directory volume 160. For example, where file management client 1 104 requests creation of the new file, metadata can be added for the new file in the directory volume 120, file volume 130, and/or shard volume 140 (e.g., as shown for the previous file FID1 in metadata 1204, 1206, 1208). In addition, the file volume 130 and/or shard volume 140 can set a snapshot identifier on the file metadata as if this file/shard was already copied to the existing snapshot, which can prevent any future copy-on-write of this file to the existing snapshot. For example, though an initial accessing of the new file and/or corresponding shard on the file volume 130 and/or shard volume 140 may otherwise result in determining that the file/shard was not yet cloned, the file volume 130 and/or shard volume 140 may determine to not clone the new file/shard based on the current snapshot identifier being greater than or equal to the snapshot identifier in the file/shard metadata.

Figure 13:
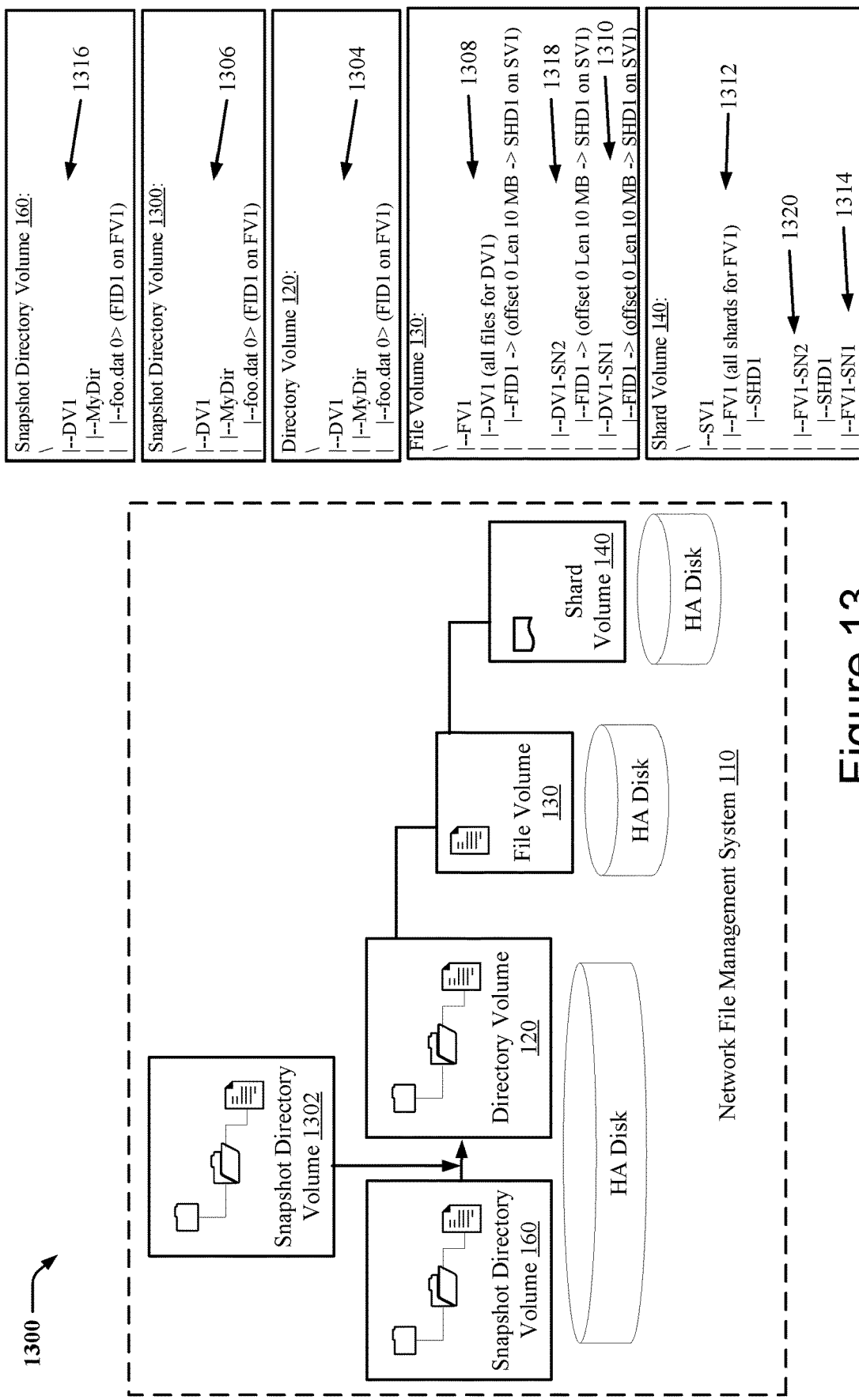
FIG. 13 is a block diagram of creating multiple snapshots in a multitier volume storage structure in accordance with one or more implementations of the present disclosure.

Referring now to FIG. 13, an example of a creating a new snapshot 1300 when another snapshot exists is illustrated, where a file management client can initiate a request to create a new snapshot of the directory volume 120. In this example, in presence of multiple snapshots older snapshot (e.g., snapshot with a lower snapshot identifier) can depend on the newer snapshot (e.g., snapshot with a higher snapshot identifier). For example, multitier snapshotting component 150 can snapshot data to the most recent snapshot (e.g., with the highest snapshot identifier). When opening a file FID or shard SHD on a snapshot, file volume 130 or shard volume 140 can look for the file/shard in a snapshot folder, and then in any newer snapshot folder until the original volume is reached.

For example, snapshot directory volume 160 can be created for directory volume 120 as SN1, as described above with reference to FIG. 7, and associated metadata can be updated (e.g., metadata 1304 can be created from metadata 1306 for the snapshot directory volume 160, metadata 1310 can be added to metadata 1308 for the file volume 130 to reference FV1 in the snapshot directory volume 160 for SN1, and metadata 1314 can be added to metadata 1312 for the shard volume 140 to reference SHD1 in the snapshot directory volume 160 for SN1). When creating the next snapshot, SN2, the file FID1 can be snapshotted in SN2 as well, as shown where multitier snapshotting component 150 can add metadata 1316 for the new snapshot directory volume 1302, and can update the metadata for the file volume 130 to add reference to SN2 1318. In addition, on the shard volume 140, SHD1 may not have actually been duplicated for SN1 (e.g., if no initial access request was made after SN1 was created), but at some later point the shard can be snapshotted to SN2. In this case, when a file management client attempts to open SHD1 on SN1 it can end up opening SHD1 on SN2 (or whatever later snapshot that has a cloned snapshot or eventually the directory volume 120 if no such clone exists).

Figure 14:
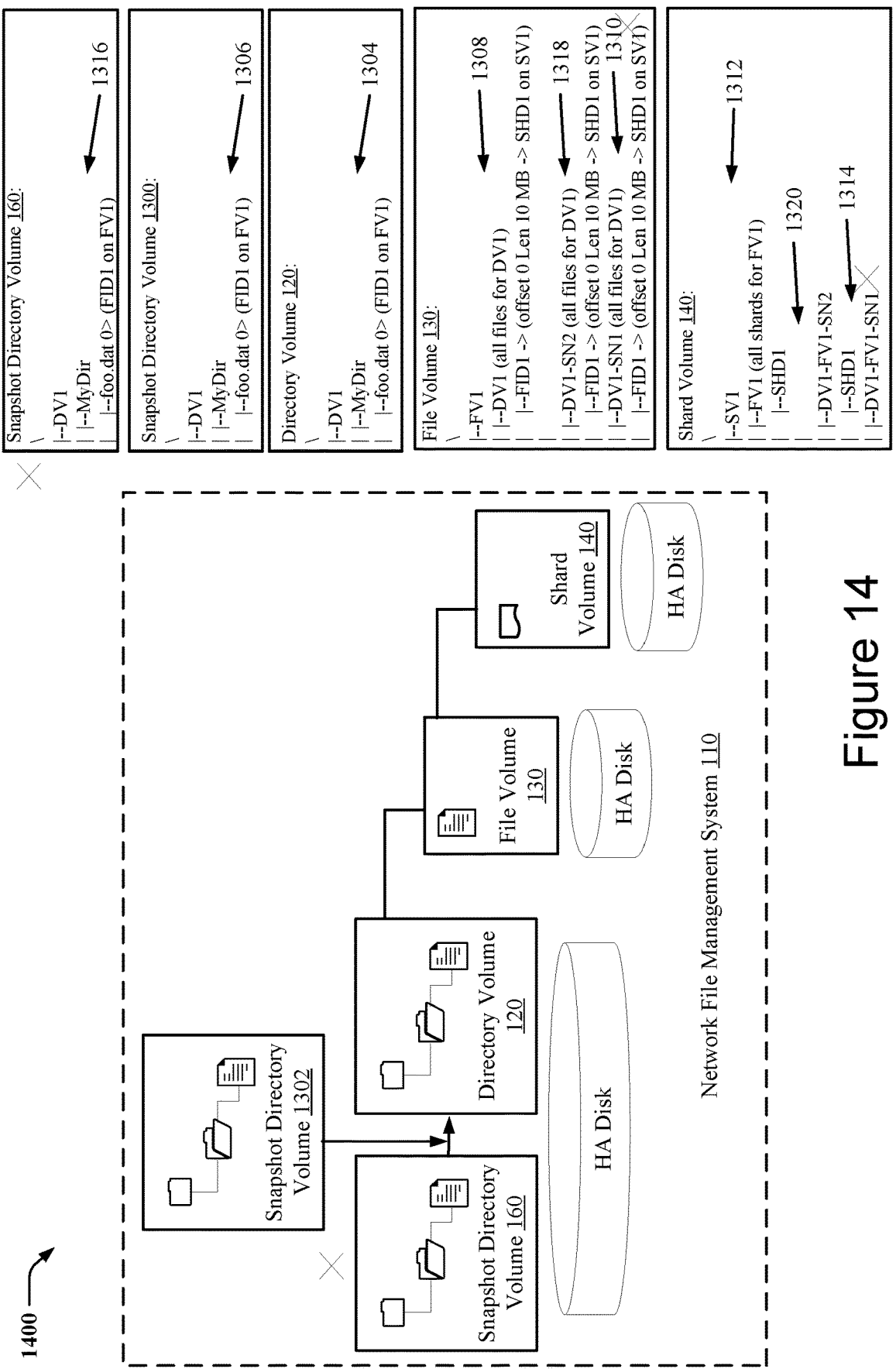
FIG. 14 is a block diagram of deleting a snapshot in a multitier volume storage structure in accordance with one or more implementations of the present disclosure.

Referring now to FIG. 14, an example of a deleting a snapshot 1400 having no snapshots depending on it is illustrated, where file management client can initiate a request to delete the snapshot. For example, multitier snapshotting component 150 can journal that the snapshot (e.g., SN1) is deleted. The directory volume service 180 can initiate garbage collection on the file volumes 130, and on each file volume 130, the snapshot folders corresponding to SN1 can be deleted and metadata 1310 may be lazily garbage collected by file volume service 182. For each shard volume 140, the corresponding snapshot folders can be deleted, and metadata 1314 can be lazily garbage collected by the shard volume service 184.

Figure 15:
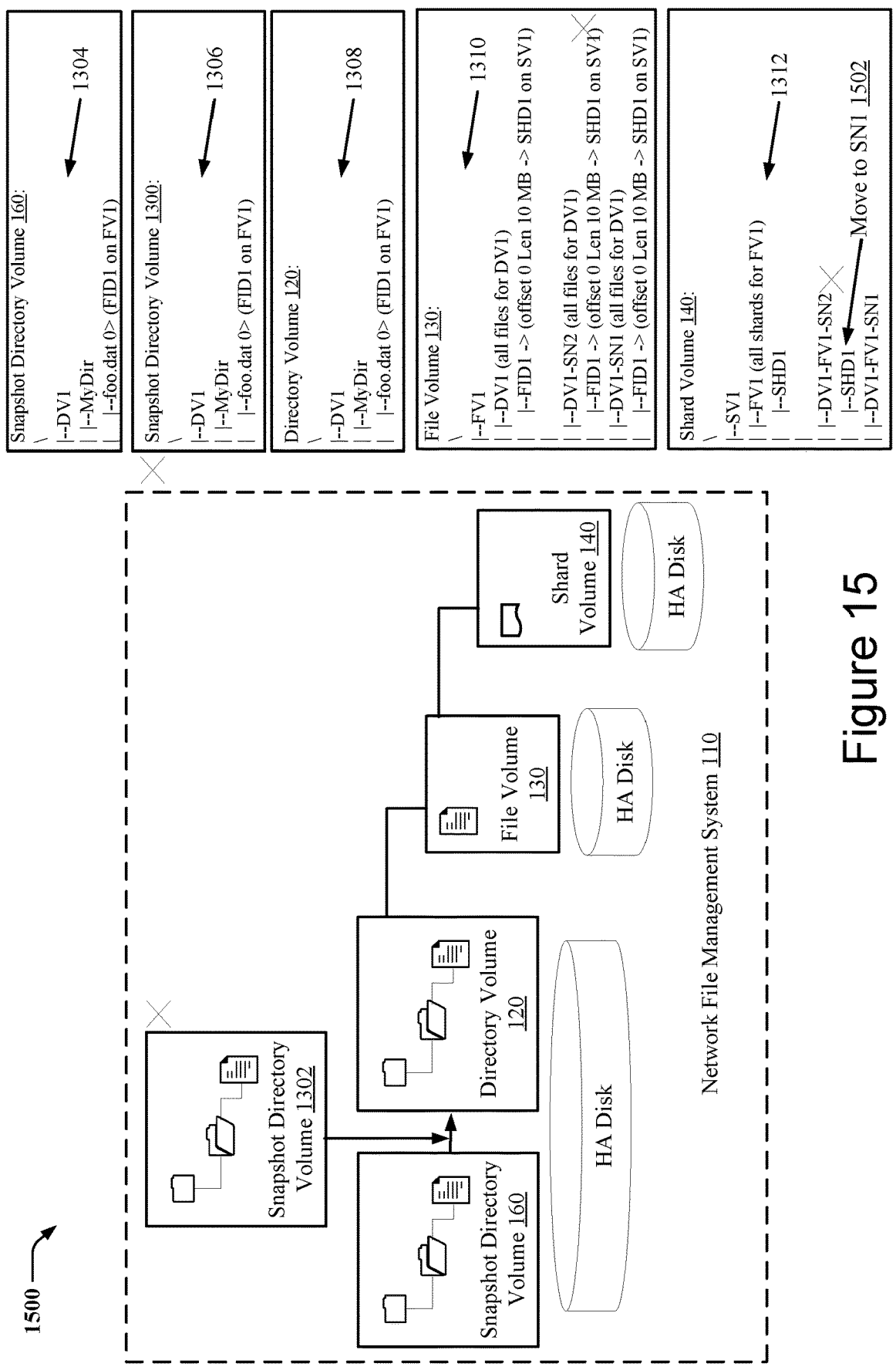
FIG. 15 is a block diagram of deleting a snapshot with dependent snapshot(s) in a multitier volume storage structure in accordance with one or more implementations of the present disclosure.

Referring now to FIG. 15, an example of a deleting a snapshot 1500 having snapshots depending on it is illustrated, where file management client can initiate a request to delete the snapshot. For example, multitier snapshotting component 150 can mark the snapshot (e.g., SN2) as deleted, and (e.g., in background) can start moving snapshotted file records and/or shard records to the next snapshot (e.g., the next snapshot with a lower snapshot identifier) that depends on the deleted snapshot. This is shown at 1502, where SHD1 can be moved from DV1-FV1-SN2 to DV1-FV1-SN1. Once the snapshot folder becomes empty (e.g., on snapshot directory volume 1302 for SN2), multitier snapshotting component 150 can delete it. This can shorten snapshot chain on file volumes and shard volumes and can speed up file open on older snapshots. This may also not reclaim any space on the file and shard volumes. Multitier snapshotting component 150 can delete snapshots after all snapshots that depend on the deleted snapshot are also deleted.

Figure 16:
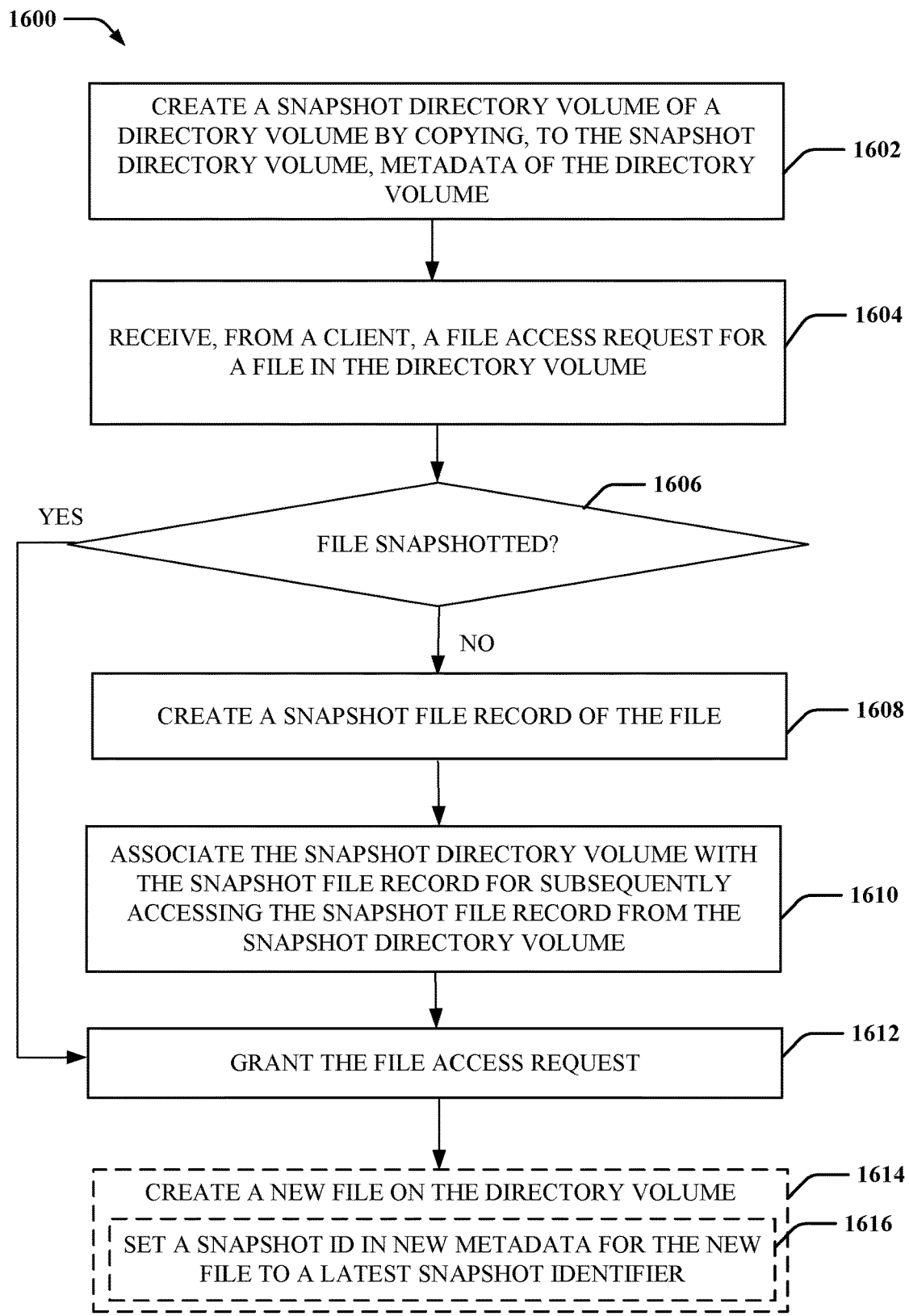
FIG. 16 is a flow chart of an example of a method for accessing files in a snapshotted multitier volume storage structure in accordance with an implementation of the present disclosure.

Referring now to FIG. 16, an example of a method 1600 for managing a snapshot at a network file management system 110 is illustrated. The actions illustrated in method 1600 may overlap in time. For example, at an instant in time, two of the actions may be performed by different components. The execution of the actions may also be interleaved on a component. Additionally, the actions illustrated in method 1600 may be performed in an order other than illustrated in FIG. 16. The actions illustrated in method 1600 may be performed by a processor, memory, or other hardware components of a computing device, as described further herein with reference to FIG. 19.

At block 1602, the method 1600 may create a snapshot directory volume of a directory volume by copying, to the snapshot directory volume, metadata of the directory volume. For example, as described herein, multitier snapshotting component 150 can receive a request (e.g., from a file management client) to create a snapshot of directory volume 120. Multitier snapshotting component 150 can accordingly create the snapshot directory volume 160, as described above, at least by copying metadata associated with directory volume 120. In addition, as described, multitier snapshotting component 150 can block file access requests for network file management system 110 until the metadata is copied. In this regard, snapshot directory volume 160 is created with metadata to point to the same files, file volumes, shards, shard volumes, etc. as directory volume 120, and the metadata can be updated using a copy-on-write mechanism, as described above, to improve performance of the snapshot creation process.

At block 1604, the method 1600 may receive, from a client, a file access request for a file in the directory volume. For example, directory volume service 180 and/or file volume service 182 may receive the request from the client (e.g., the same or a different file management client). The request can include a request to open the file for possible modification (e.g., a request other than a read-only request), a request to delete the file, etc. In addition, the request can additionally or alternatively correspond to (e.g., identify) a shard of a file and can be received by the shard volume service 186. In this example, the operations described below can occur at the shard level in addition, or alternatively, to the file level.

At block 1606, the method 1600 may determine whether the file (e.g., or shard) is snapshotted. In an example, file volume service 182 (and/or shard volume service 186) can determine whether the file (or shard) is snapshotted based on whether metadata exists indicating that the file (or shard) is snapshotted. As described above, this can include determining whether the file (or shard) has a snapshot identifier in its associated metadata, whether a separate snapshot file volume 170 (or snapshot shard volume 174) has a record of the file (or shard), etc.

If the file (or shard) has not been snapshotted, at Block 1608, the method 1600 may create a snapshot file record of the file (or snapshot shard record of the shard). This can include the copy-on-write mechanism described above where an initial access of the file (or shard) can cause a copy of the file to be made for the current snapshot. For example, file volume service 182 (or shard volume service 184) can make a copy of the file (or shard), which can be stored in a separate directory for the snapshot directory volume 160. In one example, however, a shard may not actually be duplicated in this regard unless or until a corresponding cluster of data is forked out.

In addition, in creating the snapshot file record, at Block 1610, the method 1600 can associate the snapshot directory volume with the snapshot file record for subsequently accessing the snapshot file record from the snapshot directory volume. For example, file volume service 182 (or shard volume service 184) can accordingly record metadata for the snapshot file record (or snapshot shard record) in the file volume metadata (or shard volume metadata) and/or the snapshot directory volume metadata, as described above with reference to FIGS. 8-9. Additionally or alternatively, file volume service 182 (or shard volume service 184) can accordingly create a snapshot of the file volume 130 to create snapshot file volume 170 (or create a snapshot of shard volume 140 to create snapshot shard volume 174), as additionally described above with reference to FIGS. 8-9. Moreover, in one example, file volume service 182 (or shard volume service 184) can associate a snapshot identifier of the snapshot directory volume 160 with the file (or shard) in the file volume 130 (or shard volume 140) to prevent additional duplication of the file (or shard) and to facilitate determining the snapshot associated with the file (or shard) in the case of deletion of the file, opening the file from the snapshot, deleting the snapshot or other dependent snapshots, etc., as described.

In any case, whether or not the file was determined to be snapshotted at Block 1606, at Block 1612, the method 1600 can grant the file access request (e.g., to the file management client) for the access requested (e.g., to open the file, delete the file, etc.) with respect to the file volume 130 (or shard volume 140). In one example, where the file access request includes deleting the file, granting the file access request at Block 1612 can include file volume service 182 deleting metadata associated with the file from the file volume 130, shard volume service 184 deleting metadata associated with the shard from the shard volume 140, deleting metadata from the directory volume 120, and/or the like, as described with reference to FIG. 10.

In one example, optionally at Block 1614, the method 1600 can create a new file on the directory volume. In this example, directory volume service 180 can receive the request to create the new file from a file management client. In creating the new file, optionally at Block 1616, the method 1600 can set a snapshot identifier in new metadata for the new file to a latest snapshot identifier. In this regard, where a snapshot exists for the directory volume (e.g., snapshot directory volume 160), directory volume service 180 can set the snapshot identifier for the new file to the latest snapshot identifier to avoid duplication of the new file in the snapshot upon an initial access. In this example, if a new snapshot of the directory volume 120 is created after the file, however, an initial access of the new file may cause duplication based on determining the snapshot identifier associated with the new file is less than the snapshot identifier of the new snapshot, as described above in reference to FIG. 12.

Figure 17:
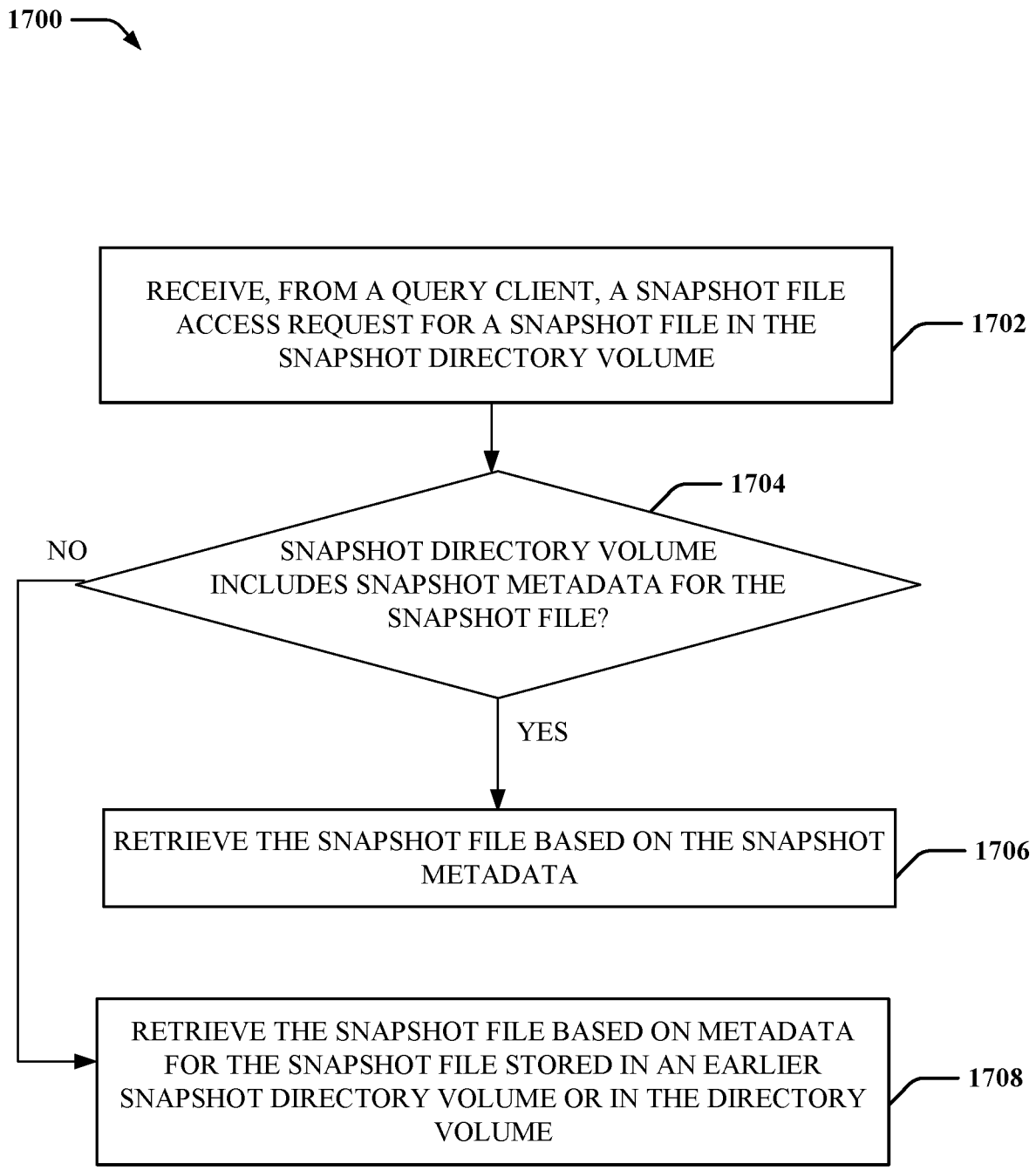
FIG. 17 is a flow chart of an example of a method for retrieving snapshotted files in a multitier volume storage structure in accordance with an implementation of the present disclosure.

Referring now to FIG. 17, an example of a method 1700 for retrieving a snapshot at a network file management system 110 is illustrated. The actions illustrated in method 1700 may overlap in time. For example, at an instant in time, two of the actions may be performed by different components. The execution of the actions may also be interleaved on a component. Additionally, the actions illustrated in method 1700 may be performed in an order other than illustrated in FIG. 17. The actions illustrated in method 1700 may be performed by a processor, memory, or other hardware components of a computing device, as described further herein with reference to FIG. 19.

At Block 1702, the method 1700 may receive, from a query client, a snapshot file access request for a snapshot file in the snapshot directory volume. For example, the query client may be an instance of a file management client, such as a backup application, that can request a snapshot, one or more files from a snapshot, etc. In any case, multitier snapshotting component 150 can determine which directory volume or associated files for which a snapshot is requested.

At Block 1704, the method 1700 can determine whether the snapshot directory volume includes snapshot metadata for the snapshot file. For example, multitier snapshotting component 150 can determine this based on retrieving the snapshot metadata for the snapshot directory volume 160, which may correspond to a snapshot identifier indicated in the request, and determining whether the snapshot metadata includes certain information regarding the snapshot file. In another example, multitier snapshotting component 150 can determine whether a snapshot file volume exists for a file volume corresponding to the file.

If the snapshot directory volume does include the snapshot metadata for the snapshot file, at Block 1706, the method 1700 can retrieve the snapshot file based on the snapshot metadata. In this example, multitier snapshotting component 150 can obtain the snapshot file from the snapshot directory associated with the snapshot directory volume 160 based on the snapshot file metadata, as described above with reference to FIG. 11.

If the snapshot directory volume does not include the snapshot metadata for the snapshot file, at Block 1708, the method 1700 can retrieve the snapshot file based on metadata for the snapshot file stored in an earlier snapshot directory volume or in the directory volume. In this example, multitier snapshotting component 150 can retrieve the snapshot file from the most recent earlier snapshot for which the snapshot file was duplicated (e.g., based on identifying a snapshot identifier of the snapshot file as being part of the earlier snapshot). Where the snapshot file requested does not have an associated snapshot identifier, multitier snapshotting component 150 can obtain the file from the original directory volume 120 and/or file volume 130.

Figure 18:
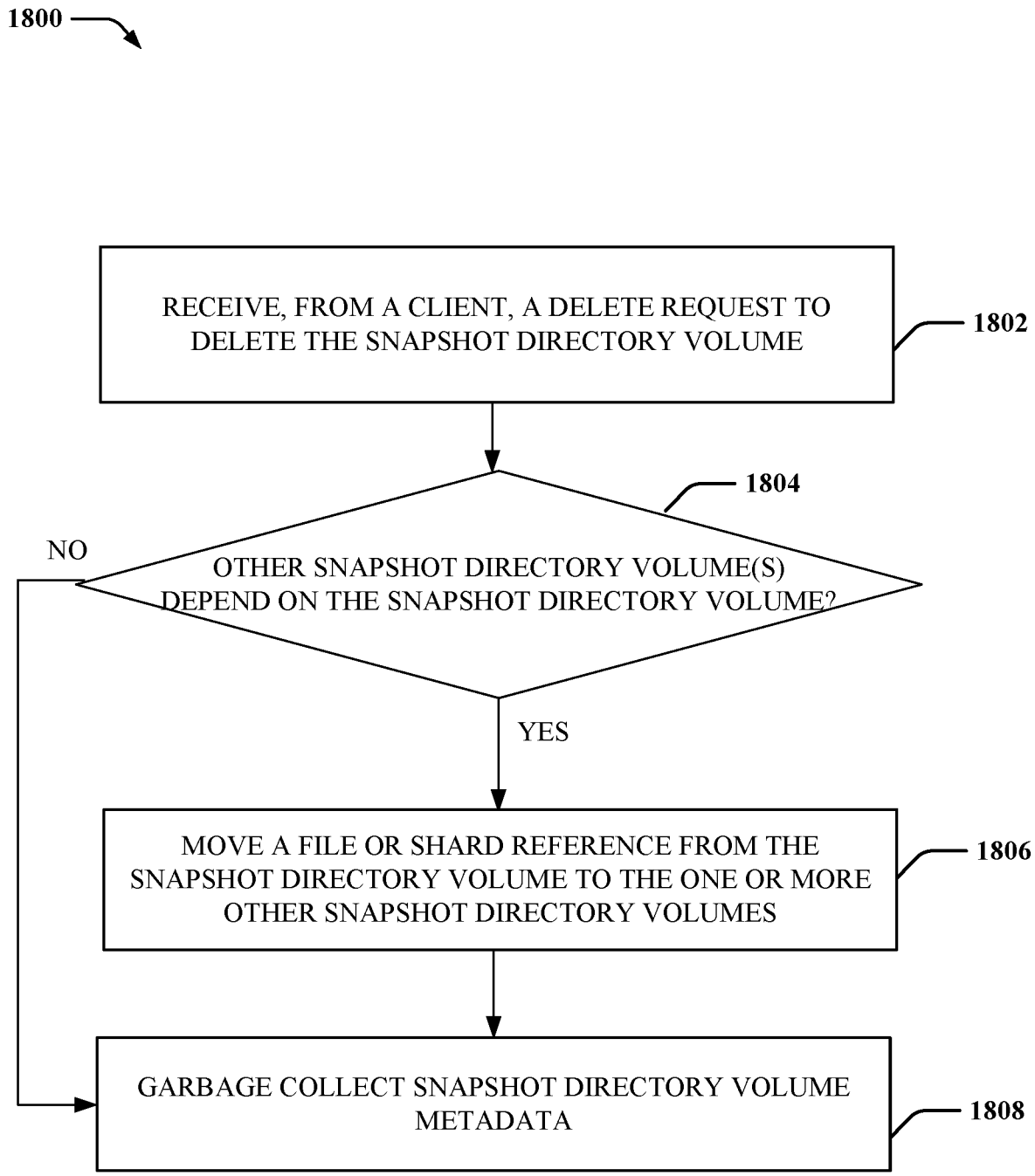
FIG. 18 is a flow chart of an example of a method for deleting snapshots in a multitier volume storage structure in accordance with an implementation of the present disclosure.

Referring now to FIG. 18, an example of a method 1800 for deleting a snapshot at a network file management system 110 is illustrated. The actions illustrated in method 1800 may overlap in time. For example, at an instant in time, two of the actions may be performed by different components. The execution of the actions may also be interleaved on a component. Additionally, the actions illustrated in method 1800 may be performed in an order other than illustrated in FIG. 18. The actions illustrated in method 1800 may be performed by a processor, memory, or other hardware components of a computing device, as described further herein with reference to FIG. 19.

At Block 1802, the method 1800 may receive, from a client, a delete request to delete the snapshot directory volume. For example, multitier snapshotting component 150 can receive the request from a file management client, which may include a backup application to manage the snapshots, to delete snapshot directory volume 160 (e.g., and/or 1302, as described with reference to FIGS. 14-15).

At block 1804, the method 1800 may determine whether other snapshot directory volume(s) depend on the snapshot directory volume. For instance, as described herein, multitier snapshotting component 150 can determine this based on whether other snapshots exist having snapshot identifiers less than that of the snapshot directory volume for which deletion is requested.

If other snapshot directory volume(s) depend on the snapshot directory volume, at block 1806, the method 1800 may move a file or shard reference from the snapshot directory volume to the one or more other snapshot directory volumes. For example, multitier snapshotting component 150 can move the file and/or shard to a folder for the one or more other snapshot directory volumes and can update the metadata of the one or more other snapshot directory volumes to reference the file or shard, as described above with reference to FIG. 15.

In either case, If other snapshot directory volume(s) depend on the snapshot directory volume, at Block 1806, and/or once all references have been moved at Block 1806, at Block 1808, the method 1800 can garbage collect snapshot directory volume metadata, as described above with reference to FIGS. 14-15.

Figure 19:
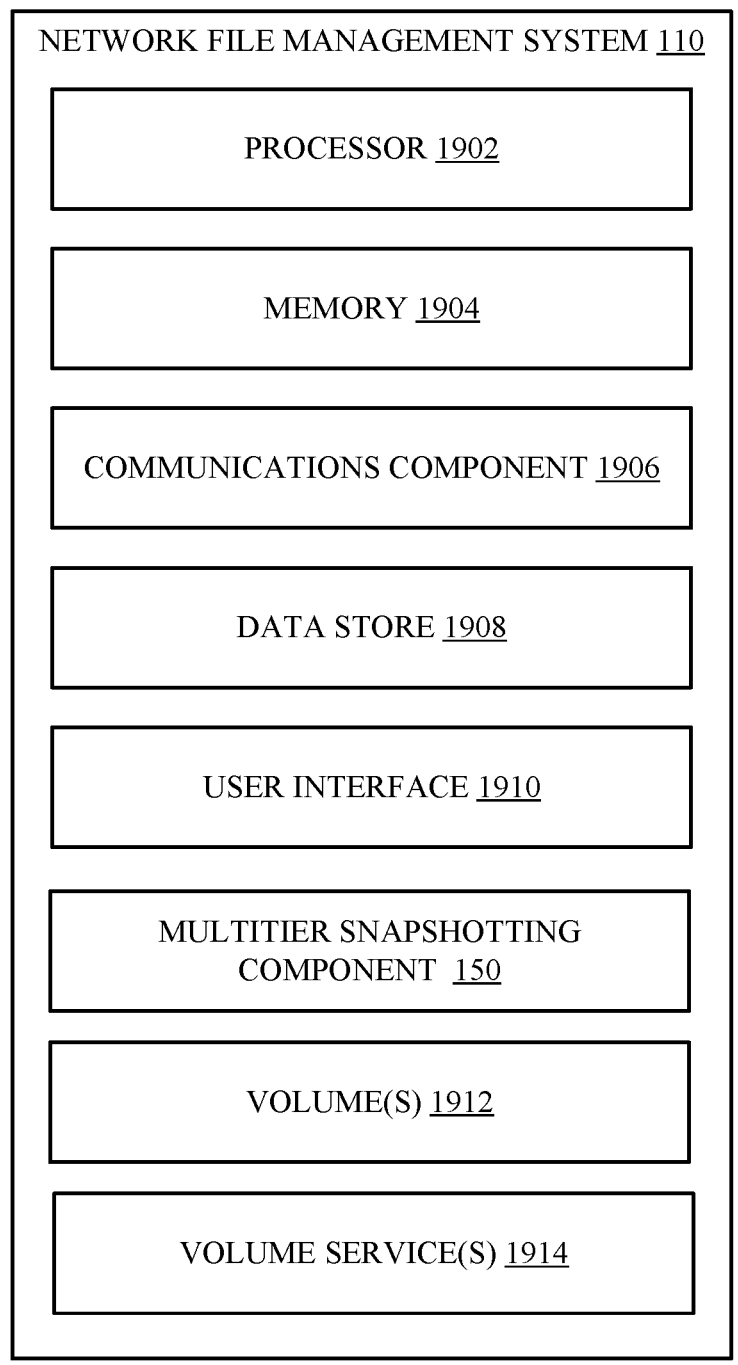
FIG. 19 is a schematic block diagram of an example implementation of the network file management system in accordance with an implementation of the present disclosure.

Referring now to FIG. 19, illustrated is an example network file management system 110 in accordance with an implementation, including additional component details (relative to multitier snapshotting component 150) as compared to FIG. 1. In one example, the network file management system 110, which may be a computer device such as a server device, may include processor 1902 for carrying out processing functions associated with one or more of components and functions described herein. Processor 1902 can include a single or multiple set of processors or multi-core processors. Moreover, processor 1902 can be implemented as an integrated processing system and/or a distributed processing system. In an implementation, for example, processor 1902 may include a CPU. In an example, the network file management system 110 may include memory 1904 for storing instructions executable by the processor 1902 for carrying out the functions described herein.

The memory 1904 may be configured for storing data and/or computer-executable instructions defining and/or associated with an operating system and/or application, and CPU may execute operating system and/or application. An example of memory can include, but is not limited to, a type of memory usable by a computer, such as random access memory (RAM), read only memory (ROM), tapes, magnetic discs, optical discs, volatile memory, non-volatile memory, and any combination thereof. Memory 1904 may store local versions of applications being executed by CPU.

The processor 1902 may be any processor specially programmed as described herein, including a controller, microcontroller, application specific integrated circuit (ASIC), field programmable gate array (FPGA), system on chip (SoC), or other programmable logic or state machine. The processor 1902 may include other processing components such as an arithmetic logic unit (ALU), registers, and a control unit. Further, the operating system may include instructions (such as one or more applications) stored in memory and executed by the CPU. The network file management system 110 may also include one or more applications including instructions stored in memory 1904 and executed by the processor 1902. Additionally, the network file management system 110 may include an operating system (not shown) that coordinates the utilization of hardware and/or software resources on the network file management system 110, as well as one or more applications that perform specialized tasks and/or provide additional functionality.

Further, the network file management system 110 may include a communications component 1906 that provides for establishing and maintaining communications with one or more parties utilizing hardware, software, and services as described herein. Communications component 1906 may carry communications between components on the network file management system 110, as well as between the network file management system 110 and external devices, such as devices located across a communications network and/or devices serially or locally connected to the network file management system 110. For example, communications component 1906 may include one or more buses, and may further include transmit chain components and receive chain components associated with a transmitter and receiver, respectively, operable for interfacing with external devices.

Additionally, the network file management system 110 may include a data store 1908, which can be any suitable combination of hardware and/or software, that provides for mass storage of information, databases, and programs employed in connection with implementations described herein. For example, data store 1908 may be a data repository for operating system and/or applications.

The network file management system 110 may also include a user interface component 1910 operable to receive inputs from a user of the network file management system 110 and further operable to generate outputs for presentation to the user. User interface component 1910 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1910 may include one or more output devices, including but not limited to a display, a speaker, a haptic feedback mechanism, a printer, any other mechanism capable of presenting an output to a user, or any combination thereof.

In an implementation, user interface component 1910 may transmit and/or receive messages corresponding to the operation of operating system and/or application. In addition, processor 1902 executes operating system and/or application, and memory 1904 or data store 1908 may store them.

The network file management system 110 may also include a multitier snapshotting component 150, as described above, which may be implemented by processor 1902 based on instructions stored in memory 1940, etc. to perform multitier snapshotting of a multitier file system. The network file management system 110 may also include volume(s) 1912, which can be at least partially stored in memory 1904 and/or data store 1908 (e.g., for storing metadata and/or a portion of the file/shards). As described, volume(s) 1912 can include a directory volume 120, file volume 130, shard volume 140, snapshot directory volume 160, snapshot file volume 170, snapshot shard volume 174, etc. The network file management system 110 may also include volume service(s) 1912, which can include a directory volume service 180, file volume service 182, shard volume service 184, etc., which can be implemented by processor 1902 and/or based on instructions stored in memory 1904 to provide the functions described herein.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method for maintaining a snapshot of a multitier distributed file system, comprising:
    creating a snapshot directory volume for a directory volume associated with a first tier of the multitier distributed file system at least in part by copying, to the snapshot directory volume, directory metadata stored on the directory volume;
    creating a snapshot file record associated with a file stored on a volume associated with a second tier of the multitier distributed file system, wherein the file is in a directory that is associated with the directory metadata; and
    associating the snapshot directory volume with the snapshot file record to enable access to the snapshot file record from the snapshot directory volume.

2. The method of claim 1, wherein creating the snapshot file record comprises copying content of the file to a snapshot file stored on a snapshot file volume associated with the second tier of the multitier distributed file system.

3. The method of claim 1, further comprising:
    copying shard metadata from the volume associated with the second tier of the multitier distributed file system to a snapshot file volume associated with the second tier of the multitier distributed file system, the first shard metadata being associated with a shard; and
    updating the shard metadata stored on a shard volume associated with a third tier of the multitier distributed file system with an identifier of the snapshot directory volume.

4. The method of claim 1, further comprising:
    removing file metadata from the directory volume; and
    retaining the file metadata in the snapshot directory volume.

5. The method of claim 4, further comprising:
    copying shard metadata from a shard volume associated with a third tier of the multitier distributed file system to a snapshot shard volume associated with the third tier of the multitier distributed file system, the shard metadata being associated with a shard of the file;
    copying content of the shard to a snapshot shard stored on the snapshot shard volume; and
    removing the shard metadata from the shard volume.

6. The method of claim 1, further comprising retrieving a snapshot of the file based on snapshot file metadata being stored in another snapshot directory volume but not in the directory volume, the other snapshot directory volume having been created prior to the creating the snapshot directory volume.

7. The method of claim 1, further comprising setting a snapshot identifier in file metadata associated with another file to prevent subsequent copying of the other file in response to a file access request for the other file.

8. A storage system, comprising:
    a memory configured to store instructions;
    at least one processor in communication with the memory and configured to execute the instructions to:
        create a snapshot directory volume fora directory volume associated with a first tier of a multitier distributed file system at least in part by copying, to the snapshot directory volume, directory metadata stored on the directory volume;
        create a snapshot file record associated with a file stored on a volume associated with a second tier of the multitier distributed file system, wherein the file is in a directory that is associated with the directory metadata; and
        associate the snapshot directory volume with the snapshot file record to enable access to the snapshot file record from the snapshot directory volume.

9. The storage system of claim 8, wherein the at least one processor is further configured to execute the instructions to create the snapshot file record at least in part by copying content of the file to a snapshot file stored on a snapshot file volume associated with the second tier of the multitier distributed file system.

10. The storage system of claim 8, wherein the at least one processor is further configured to execute the instructions to:
copy shard metadata from the volume associated with the second tier of the multitier distributed file system to a snapshot file volume associated with the second tier of the multitier distributed file system, the shard being associated with the shard metadata; and
update the shard metadata stored on a shard volume associated with a third tier of the multitier distributed file system with an identifier of the snapshot directory volume.

11. The storage system of claim 8, wherein the at least one processor is further configured to execute the instructions to:
remove file metadata from the directory volume; and
retain the file metadata in the snapshot directory volume.

12. The storage system of claim 8, wherein the at least one processor is further configured to execute the instructions to retrieve a snapshot of the file based on snapshot file metadata being stored in another snapshot directory volume but not in the directory volume, the other snapshot directory volume having been created prior to the creating the snapshot directory volume.

13. The storage system of claim 8, wherein the at least one processor is further configured to execute the instructions to set a snapshot identifier in file metadata associated with another file to prevent subsequent copying of the other file in response to a file access request for the other file.

14. The method of claim 1, wherein creating the snapshot file record comprises copying content of the file to an offset within the file stored on the volume associated with the second tier of the multitier distributed file system.

15. The storage system of claim 11, wherein the at least one processor is further configured to execute the instructions to:
copy shard metadata from a shard volume associated with a third tier of the multitier distributed file system to a snapshot shard volume associated with the third tier of the multitier distributed file system, the shard metadata being associated with a shard of the file;
copy content of the shard to a snapshot shard stored on the snapshot shard volume; and
remove the shard metadata from the shard volume.

16. The storage system of claim 8, wherein the at least one processor is configured to execute the instructions to create the snapshot file record at least in part by copying content of the file to an offset within the file stored on the volume associated with the second tier of the multitier distributed file system.

17. A storage system, comprising:
a data store comprising:
a directory volume associated with a first tier of a multitier distributed file system, the directory volume having stored thereon directory metadata of a directory of the multitier distributed file system; and
a file volume associated with a second tier of the multitier distributed file system, the file volume having stored thereon file metadata of a file stored in the directory; and
at least one processor in communication with the data store, the at least one processor configured to:
create a snapshot directory volume for the directory volume associated with the first tier of the multitier distributed file system at least in part by copying, to the snapshot directory volume, the directory metadata;
create a snapshot file record associated with the file; and
associate the snapshot directory volume with the snapshot file record to enable access to the snapshot file record from the snapshot directory volume.

18. The storage system of claim 17, wherein the at least one processor is configured to create the snapshot file record at least in part by:
creating a snapshot file volume associated with the second tier of the multitier distributed file system; and
copying content of the file to a snapshot file on the snapshot file volume.

19. The storage system of claim 17, wherein the at least one processor is configured to create the snapshot file record at least in part by copying content of the file to an offset within the file stored on the file volume.

20. The storage system of claim 17, wherein the data store further comprises previously created snapshot directory volumes of the directory volume associated with the first tier of the multitier distributed file system.

* * * * *